US012469691B2

(12) United States Patent
Stewart et al.

(10) Patent No.: US 12,469,691 B2
(45) Date of Patent: Nov. 11, 2025

(54) HIGH RESOLUTION MULTI-REFLECTION TIME-OF-FLIGHT MASS ANALYSER

(71) Applicant: Thermo Fisher Scientific (Bremen) GmbH, Bremen (DE)

(72) Inventors: Hamish Stewart, Bremen (DE); Dmitry Grinfeld, Bremen (DE); Bernd Hagedorn, Bremen (DE); Robert Ostermann, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 314 days.

(21) Appl. No.: 18/118,461

(22) Filed: Mar. 7, 2023

(65) Prior Publication Data

US 2023/0290629 A1 Sep. 14, 2023

(51) Int. Cl.
*H01J 49/40* (2006.01)
*H01J 49/06* (2006.01)

(52) U.S. Cl.
CPC .......... *H01J 49/406* (2013.01); *H01J 49/061* (2013.01)

(58) Field of Classification Search
CPC .......... H01J 49/00; H01J 49/02; H01J 49/025; H01J 49/0027; H01J 49/06; H01J 49/26; H01J 49/32; H01J 49/40; H01J 49/401; H01J 49/403; H01J 49/408; H01J 49/406; H01J 49/061; H01J 49/0031
USPC ........................................ 250/282, 281, 287
See application file for complete search history.

(56) References Cited

U.S. PATENT DOCUMENTS

| | | | |
|---|---|---|---|
| 5,654,544 | A | 8/1997 | Dresch |
| 7,999,223 | B2 | 8/2011 | Makarov et al. |
| 8,921,775 | B2 | 12/2014 | Langridge et al. |
| 9,312,119 | B2 | 4/2016 | Verenchikov |

(Continued)

FOREIGN PATENT DOCUMENTS

| | | | |
|---|---|---|---|
| CN | 103165395 | A | 6/2013 |
| GB | 2580089 | A | 7/2020 |
| GB | 2625228 | A | 6/2024 |

(Continued)

OTHER PUBLICATIONS

A Verenchikov et al., Multiplexing in Multi-Reflecting TOF MS, Journal of Applied Chemistry and Modeling, vol. 6, Mar. 2, 2017, pp. 1 to 22.

(Continued)

*Primary Examiner* — Jason L McCormack
(74) *Attorney, Agent, or Firm* — ALG Intellectual Property, LLC

(57) ABSTRACT

Systems, methods, and computer-readable media described provide multi-reflection time-of-flight analyser (e.g. of a type in which the ion beam is allowed to spread out relatively broadly) and methods for use in a zoom mode, in which time-of-flight perturbations induced by reflections at the deflector are cancelled out or removed, such that they do not give rise to a significant increase in the arrival time spread of ions at the detector. This accordingly facilitates high resolution operation of the analyser in the zoom mode. Furthermore, this is done in a way which allows the analyser to remain drift focused, which in turn means that the analyser can be straightforwardly and seamlessly switched between its normal mode of operation and the zoom mode of operation.

22 Claims, 12 Drawing Sheets

(56) References Cited

U.S. PATENT DOCUMENTS

| | | | | |
|---|---|---|---|---|
| 2007/0158545 A1* | 7/2007 | Verentchikov | ........ | H01J 49/004 250/282 |
| 2011/0186729 A1* | 8/2011 | Verentchikov | .......... | H01J 49/22 250/282 |

FOREIGN PATENT DOCUMENTS

| | | |
|---|---|---|
| JP | 2007526596 | 9/2007 |
| JP | 2021141063 A | 9/2021 |

OTHER PUBLICATIONS

High performance gridless ion mirrors for multi-reflection time-of-flight and electrostatic trap mass analyzers, International Journal of Mass Spectrometry, vol. 426, Jan. 12, 2018, M Yavor et al., pp. 1 to 11.

* cited by examiner

HIGH RESOLUTION MULTI-REFLECTION TIME-OF-FLIGHT MASS ANALYSER

FIELD OF THE INVENTION

The present invention relates to the field of time-of-flight mass spectrometry (ToF-MS) and time-of-flight (ToF) analysers, and in particular to multi-reflection time-of-flight (MR-ToF) analysers.

BACKGROUND

A multi-reflection time-of-flight (MR-ToF) analyser typically includes two elongated ion mirrors which are each arranged along a drift direction Y, where the ion mirrors are spaced apart in an orthogonal X-direction. As ions pass along the analyser in the drift direction Y, they make multiple reflections in the X-direction between two ions mirrors. The ions are eventually detected by a detector, and their mass to charge ratio (m/z) is determined from their drift time through the analyser.

It can be desirable to increase the resolution of the analyser, both to increase the separation of analyte ions and to improve their accurate mass assignment. Generally, an analyser's resolution is limited by the length of the ion flight path through the analyser, and the arrival time spread of ions at the detector.

The article A. Verenchikov, et al., Journal of Applied Solution Chemistry and Modelling, 2017, 6, 1-22, the entire contents of which is incorporated herein by reference, describes a "zoom mode" for an MR-ToF analyser which uses a set of periodic lenses to focus the ion beam, whereby ions can be made to make multiple cycles within the analyser in the drift direction Y. Increasing the number of cycles N increases the length of the ion flight path that ions take within the analyser, thereby increasing the resolution of the analyser.

It is believed that there remains scope for improvements to multi-reflection time-of-flight (MR-ToF) analysers.

SUMMARY

A first aspect provides a method of operating a multi-reflection time-of-flight (MR-ToF) mass analyser that comprises:

- two ion mirrors spaced apart and opposing each other in a first direction X, each mirror elongated generally along a drift direction Y between a first end and a second end, the drift direction Y being orthogonal to the first direction X;
- an ion injector for injecting ions into a space between the ion mirrors, the ion injector located in proximity with the first end of the ion mirrors;
- a detector for detecting ions after they have completed a plurality of reflections between the ion mirrors, the detector located in proximity with the first end of the ion mirrors; and
- a deflector located in proximity with the first end of the ion mirrors;

the method comprising:

(i) injecting ions from the ion injector into the space between the ion mirrors, wherein the ions complete a first cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(ii) using the deflector to reverse the drift direction velocity of the ions such that the ions are caused to complete a further cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(iii) optionally repeating step (ii) one or more times; and then (iv) causing the ions to travel from the deflector to the detector for detection.

The method may comprise causing the ions to travel from the deflector to the detector for detection only after the ions have completed in total an odd number of cycles.

Embodiments provide a method of operating a multi-reflection time-of-flight (MR-ToF) mass analyser. The analyser comprises two elongated ion mirrors that are spaced apart and face one another in a first direction X, where each mirror is elongated along a drift direction Y between a first end and a second end of the ion mirrors, and where the drift direction Y is orthogonal to the first direction X. The mass analyser also comprises an ion injector, a detector, and a deflector located in proximity with the first end of the ion mirrors.

Particular embodiments relate to MR-ToF mass analysers in which the ion beam is allowed to spread out relatively broadly (in the drift direction Y) for most of its flight path, such as tilted-mirror type MR-ToFs, and single focusing lens type MR-ToFs (as will be described in more detail below). When compared with MR-ToFs that include a set of periodic lenses configured to keep the ion beam focused along its flight path, these analysers have the benefit of significantly reduced space charge effects within the analyser.

The analyser may be operated in a "normal" mode of operation, whereby ions are injected from the ion injector into the space between the ion mirrors of the analyser. The ions may be reflected in one of the ion mirrors and may then travel to the deflector. The ions may then adopt a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector. The ions may then be caused to travel from the deflector to the detector for detection.

Embodiments provide a method of operating the analyser in an additional mode of operation, which is referred to herein as a "zoom" mode of operation. In the method, ions are caused to complete plural (N) cycles within the analyser, where in each cycle the ions drift in the drift direction Y from the deflector towards the opposite (second) end of the ion mirrors, and then back to the deflector. In each cycle, the ions also complete plural (K) reflections between the ion mirrors in the X direction. Thus, in each cycle, the ions adopt a zigzag ion path through the space between the ion mirrors.

In the method, the initial cycle is initiated by injecting the ions into the space between the ion mirrors. The ions may be reflected in one of the ion mirrors and may then travel to the deflector. The ions then adopt a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector.

After the ions have completed this initial cycle, each further cycle is initiated by using the deflector to reverse the drift direction velocity of the ions (in proximity with the first end of the ion mirrors). To do this, an appropriate voltage may be applied to the deflector that causes ions to leave the deflector with a drift direction velocity opposite to the drift direction velocity with which the ions originally entered the deflector.

After the ions have completed the desired (plural) number (N) of cycles within the analyser, the ions are allowed to travel from the deflector to the detector for detection. To do this, the voltage may be removed from the deflector (or else an appropriate voltage may be applied to the deflector) such that the ions are caused to exit the deflector in a direction towards the detector. The ions may be reflected in (the other) one of the ion mirrors before travelling to (and being detected by) the detector.

This "zoom" mode of operation beneficially has the effect of increasing the length of the ion path taken by ions within the analyser (between the injector and the detector), thereby increasing the resolution of the analyser.

However, as mentioned above, the analyser's resolution is limited not only by the length of the ion flight path through the analyser, but also by the arrival time spread of ions at the detector. In this regard, the inventors have now recognised that each reflection at the deflector can create a time-of-flight perturbation, which manifests as a tilting of the ions' focal plane. This, in turn, can severely limit the resolving power of the analyser. This problem did not arise for MR-ToF analysers that include a set of periodic lenses, because in these analysers the ion beam remains focused along its flight path.

In this regard, the inventors have furthermore recognised that, where the analyser is drift focused (as should be the case to facilitate the "normal" mode of operation), a second drift reflection produces a time-of-flight error which cancels out the first; and more generally, that the time-of-flight error will be cancelled out for an even number of reflections.

Thus, in accordance with some embodiments, in the zoom mode, ions are sent to the detector for detection only after they have completed in total an odd number of cycles (and not an even number of cycles), i.e. only after their drift direction velocity has been reversed by the deflector in total an even number of times (and not an odd number of times).

In further embodiments, rather than cancelling out the time-of-flight perturbation by using the deflector to reverse the drift direction velocity of ions an even number of times, the time-of-flight perturbation caused by each reversal of the drift direction velocity is instead removed at source by applying a voltage to the deflector that has the effect of causing the drift direction velocity of the ions to be reduced to approximately zero. This causes the ions to exit the deflector in the first X direction, whereupon the ions are reflected from an ion mirror back to the deflector. When the ions arrive back at the deflector, the (same) voltage on the deflector acts to change the drift direction velocity of the ions from zero to a drift direction velocity opposite to the drift direction velocity with which the ions originally entered the deflector. In this way, the drift direction velocity of the ions is reversed by the deflector in a "two-step" mode without introducing a time-of-flight perturbation.

However, in some of these embodiments, after each cycle, the ions will return to the deflector from the opposite side (in the X direction). This means that ions cannot be extracted to the detector after their drift direction velocity has been reversed by the deflector only once (or more generally an odd number of times), only unhelpfully to the injector. Thus again, in accordance with some embodiments, in the zoom mode, ions are sent to the detector for detection only after they have completed in total an odd number of cycles (and not an even number of cycles), i.e. only after their drift direction velocity has been reversed by the deflector in total an even number of times (and not an odd number of times).

In yet further embodiments, the analyser comprises first and second deflectors located at either end of the ion mirrors, and both deflectors are operated using this "two-step" drift direction velocity reversal mode. This allows ions to return to the first deflector from the correct side (in the X direction) so as to be extracted to the detector after any (odd or even) number of cycles.

It will be appreciated that embodiments provide a method of operating an MR-ToF analyser (e.g. of a type in which the ion beam is allowed to spread out relatively broadly) in a zoom mode, in which time-of-flight perturbations induced by reflections at the deflector are cancelled out or removed, such that they do not give rise to a significant increase in the arrival time spread of ions at the detector. This accordingly facilitates high resolution operation of the analyser in the zoom mode. Furthermore, this is done in a way which allows the analyser to remain drift focused, which in turn means that the analyser can be straightforwardly and seamlessly switched between its normal mode of operation and the zoom mode of operation, e.g. by appropriate control of the voltage applied to the deflector.

It will be appreciated that embodiments provide an improved multi-reflection time-of-flight (MR-ToF) analyser.

The analyser may be a tilted-mirror type multi-reflection time-of-flight mass analyser, e.g. of the type described in U.S. Pat. No. 9,136,101, the contents of which are incorporated herein by reference. Thus, the ion mirrors may be a non-constant distance from each other in the X direction along at least a portion of their lengths in the drift direction Y. The drift direction velocity of ions towards the second end of the ion mirrors may be opposed by an electric field resulting from the non-constant distance of the two mirrors from each other. This electric field may cause the ions to reverse their drift direction velocity in proximity with the second end of the ion mirrors and drift back along the drift direction towards the deflector.

Alternatively, the analyser may be a single focusing lens type multi-reflection time-of-flight mass analyser, e.g. of the type described in UK U.S. Pat. No. 2,580,089, the contents of which are incorporated herein by reference. Thus, the deflector may be a first deflector, and the analyser may comprise a second deflector located in proximity with the second end of the ion mirrors. The second deflector may be configured to cause the ions to reverse their drift direction velocity in proximity with the second end of the ion mirrors and drift back along the drift direction towards the deflector. To do this, a suitable voltage may be applied to the second deflector, e.g. in the manner described in UK U.S. Pat. No. 2,580,089.

The deflector may be located approximately equidistant (in the X direction) between the first and second ion mirrors. The deflector may be arranged along the ion path after the first ion mirror reflection (in the first ion mirror) that the ion beam experiences after being injected from the injector, but before its second ion mirror reflection (in the second ion mirror). Correspondingly, the deflector may be arranged along the ion path before the final ion mirror reflection (in the second ion mirror) that the ion beam experiences before arriving at the detector, but after its penultimate ion mirror reflection (in the first ion mirror).

The deflector may comprise one or more trapezoid shaped or prism-like electrodes arranged adjacent to the ion beam. This deflector design has a suitably wide acceptance, such that an ion beam that is spread out relatively broadly in the drift direction can be properly received and deflected by the deflector. The deflector may comprise a first trapezoid shaped or prism-like electrode arranged above the ion beam and a second trapezoid shaped or prism-like electrode arranged below the ion beam. The electrode(s) may be angled with respect to the ion beam, such that when suitable (DC) voltage(s) is(are) applied to the electrode(s), the resulting electric field induces a deflection in the ion beam. Suitable deflection voltages are of the order of ±a few volts, ±tens of volts, or ±hundreds of volts.

The deflector should be (and in embodiments is) configured such that it can cause the ion beam to be deflected by a desired (selected) angle. The angle by which the ion beam is deflected by the deflector may be adjustable, e.g. by adjusting the magnitude of a (DC) voltage(s) applied to the deflector. The deflector may be configured such that is can deflect the ion beam by any desired angle.

The method comprises injecting ions from the ion injector into the space between the ion mirrors. The ions may then be reflected in the first ion mirror and may then travel to the deflector. When the ions reach the deflector, the deflector may be configured so as not to deflect the ion beam (or so as to deflect the ion beam by a suitably small angle), e.g. so as not to substantially change the drift direction velocity of the ions, such that the ions continue beyond the deflector and are reflected in the second ion mirror. This may comprise, for example, not applying or removing a voltage from the deflector (or applying a suitably small voltage to the deflector). The ions are then caused to complete a first cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector.

After the ions have completed this first cycle, the deflector is used to reverse the drift direction velocity of the ions such that the ions are caused to complete a further cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector. To do this, the deflector may be configured such that the ion beam is deflected, e.g. such that the drift direction velocity of the ions is reversed. This may comprise applying a suitable voltage(s) to the deflector, e.g. during a time period in which it is expected that the ions will arrive back at the deflector. Suitable deflection voltages to reverse the drift direction of the ions are of the order of hundreds of volts.

Using the deflector to reverse the drift direction velocity of the ions may comprise applying a voltage(s) to the deflector that causes ions to exit the deflector with a drift direction velocity opposite to the drift direction velocity with which the ions entered the deflector, e.g. where the reversal of the ions' drift direction velocity is achieved by the deflector deflecting the ions only once. As used herein, this may be referred to as a "single-step" deflection.

Alternatively, using the deflector to reverse the drift direction velocity of the ions may comprise applying a voltage(s) to the deflector that causes the drift direction velocity of the ions to be reduced to approximately zero, such that ions exit the deflector in the first X direction and are reflected from an ion mirror back into the deflector, whereupon the deflector acts to change the drift direction velocity of the ions from zero to a drift direction velocity opposite to the drift direction velocity with which the ions originally entered the deflector. Thus, the reversal of the ions' drift direction velocity may be achieved by the deflector deflecting the ions twice. As used herein, this may be referred to as a "two-step" deflection.

In the method, the step of using the deflector to reverse the drift direction velocity of the ions is repeated one or more times. Thus, the method comprises causing the ions to complete plural (N) cycles within the analyser, where in each cycle the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector. The first cycle is initiated by injecting the ions into the space between the ion mirrors, and after the ions have completed the first cycle, each further cycle is initiated by using the deflector to reverse the drift direction velocity of the ions.

The method comprises causing the ions to travel from the deflector to the detector for detection. That is, after the ions have completed the desired (plural) number (N) of cycles within the analyser, the ions are allowed to travel from the deflector to the detector for detection. To do this, the deflector may be configured so as not to deflect the ion beam (or so as to deflect the ion beam by a suitably small angle), e.g. so as not to substantially change the drift direction velocity of the ions, such that the ions continue beyond the deflector, are reflected in the second ion mirror, and continue on to the detector. This may comprise, for example, not applying or removing a voltage(s) from the deflector (or applying a suitably small voltage to the deflector) such that the ions are caused to exit the deflector in a direction towards the detector. The ions may be reflected in one of the ion mirrors before travelling to the detector.

Upon reaching the detector, the ions may be detected by the detector, e.g. their arrival time may be recorded by the detector. The time-of-flight and/or mass to charge ratio of the ions may then be determined, optionally combined with time-of-flight and/or mass to charge ratio information of other ions, and e.g. a mass spectrum may be produced. It should be noted that not all of the ions that were injected into the analyser may be detected by the detector, e.g. due to inevitable losses at various points between the injector and the detector and/or detector inefficiencies. Thus, as used herein the term "the ions" should be understood as meaning "some, most or all of the ions".

The method may comprise causing the ions to travel from the deflector to the detector for detection only after the ions have completed in total an odd number of cycles (and not an even number of cycles). That is, the total number of cycles, being made up of the first cycle and two or more further cycles, may be an odd number of cycles (and not an even number of cycles). In other words, between being injected and being detected, the ions may be caused to complete in total an odd number of cycles (and not an even number of cycles), where in each cycle the ions drift from the deflector towards the second end of the ion mirrors and then back to the deflector. Thus, for example, between being injected and being detected, the ions may be caused to complete in total 3, 5, 7, 9, etc. such cycles (and not 2, 4, 6, 8, etc. cycles).

Correspondingly, the method may comprise causing the ions to travel from the deflector to the detector for detection only after the drift direction velocity of the ions has been reversed by the deflector in total an even number of times (and not an odd number of times). That is, between being injected and being detected, the drift direction velocity of the ions may be reversed by the deflector in total an even number of times (and not an odd number of times). Thus, for example, between being injected and being detected, the drift direction velocity of the ions may be reversed by the deflector in total 2, 4, 6, 8, etc. times (and not 1, 3, 5, 7, etc. times).

Where, as described above, each reflection at the deflector creates a time-of-flight perturbation (as will be the case for single step deflections), an even number of reflections means that the time-of-flight perturbation will be cancelled out, thereby ensuring high resolution operation of the analyser in the zoom mode. Where, as described above, this time-of-flight perturbation is removed at source (as will be the case for two-step deflections), after each cycle, the ions will return to the deflector from the opposite side (in the X direction). Thus, an even number of reflections means that the ions can be properly extracted to the detector for detection.

The method may comprise preventing ions that have completed in total an even number of cycles from travelling from the deflector to the detector. Correspondingly, the method may comprise preventing ions whose drift direction velocity has been reversed by the deflector in total an odd number of times from travelling from the deflector to the detector. This may occur due to these ions being physically prevented from reaching the detector, e.g., where as described above two-step deflections are used.

Additionally or alternatively, the method may comprise filtering or selecting ions according to their mass to charge ratio (m/z), e.g. using a mass filter arranged upstream of the analyser, such that the ions received by the injector and injected into the analyser are within a selected mass to charge ratio (m/z) range. The mass to charge ratio (m/z) range may be selected (in combination with the timings of changes to the voltage(s) applied to the deflector) such that the ions injected into the analyser can only complete in total an odd number of cycles (and not an even number of cycles) before travelling from the deflector to the detector.

In further embodiments, where the analyser comprises a first deflector located in proximity with the first end of the ion mirrors, and a second deflector located in proximity with the second end of the ion mirrors, the second deflector may be used to reverse the drift direction velocity of the ions by applying a voltage to the second deflector that causes the drift direction velocity of the ions to be reduced to approximately zero, such that ions exit the second deflector in the first X direction and are reflected from an ion mirror back into the second deflector, whereupon the second deflector acts to change the drift direction velocity of the ions from zero to a drift direction velocity opposite to the drift direction velocity with which the ions originally entered the second deflector. Where the first deflector is also operated in this "two-step" drift direction velocity reversal mode, the method may comprise causing the ions to travel from the first deflector to the detector for detection after the ions have completed any (odd or even) number of cycles. Thus, for example, between being injected and being detected, the ions may be caused to complete in total 2, 3, 4, 5, 6, 7, 8, 9, etc. cycles.

The method may comprise operating the analyser in another ("normal", non-zoom) mode of operation comprising:

- injecting ions from the ion injector into the space between the ion mirrors, and causing the ions to follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector; and then
- causing the ions to travel from the deflector to the detector for detection.

In this other mode of operation, the deflector is not (is other than) used to reverse the drift direction velocity of the ions. That is, the method comprises, in the other mode of operation, causing the ions to travel from the deflector to the detector for detection after the ions have completed in total only a single cycle. To do this, the deflector may be configured so as not to deflect the ion beam (or so as to deflect the ion beam by a suitably small angle), e.g., so as not to significantly change the drift direction velocity of the ions, such that the ions continue beyond the deflector, are reflected in the second ion mirror, and continue on to the detector. This may comprise, for example, not applying or removing a voltage(s) to the deflector (or applying a suitably small voltage to the deflector) such that the ions are caused to exit the deflector in a direction towards the detector. The ions may be reflected in one of the ion mirrors before travelling to (and being detected by) the detector.

The analyser may be drift focused, e.g. such that in the other mode of operation, ions will arrive at the detector with a relatively narrow arrival time spread. Suitable methods for drift focusing the analyser are described in detail in U.S. Pat. No. 9,136,101 and UK U.S. Pat. No. 2,580,089.

Thus, for example, the (e.g., tilted mirror type) analyser may further comprise one or more electrically biased compensation electrodes extending along at least a portion of the drift direction, each electrode being located in or adjacent the space between the mirrors. The compensation electrodes may be electrically biased such that the period of ion oscillation between the mirrors is substantially constant along the whole of the drift length. The compensation electrodes may comprise a pair of "stripe" electrodes, e.g. as described in U.S. Pat. No. 9,136,101.

Additionally or alternatively, the analyser may comprise an ion focusing arrangement at least partly located between the opposing ion mirrors and configured to provide focusing of the ion beam in the drift direction Y, such that a spatial spread of the ion beam in the drift direction Y passes through a single minimum at or immediately after a reflection having a number between 0.25K and 0.75K, e.g. as described in UK U.S. Pat. No. 2,580,089. Thus, for example, the ion focusing arrangement may comprise a drift focusing lens configured to focus the ions in the drift direction Y. The drift focusing lens may comprise one or more lens electrodes arranged within the deflector.

In these embodiments, the method may comprise applying a voltage to the (electrode(s) of the) drift focusing lens, wherein the resulting electric field causes the ions to be focused (collimated) in the drift direction Y. The voltage applied to the lens may be controlled (adjusted), e.g. within a range of ±a few hundreds of volts. A first voltage may be applied to the (electrode(s) of the) drift focusing lens when the ions are injected into the space between the ion mirrors, and a second different voltage may be applied to the (electrode(s) of the) drift focusing lens when the deflector is used to reverse the drift direction velocity of the ions. Applying different voltages to the lens in this manner can improve collimation of the ion beam in the zoom mode, because the voltage needed to collimate the expanding beam from the injector can be very different to that needed to maintain the collimation for each further cycle. For example, the first voltage may be of the order of hundreds of volts, while the second voltage may be of the order of tens of volts. Either the second or a third (different) voltage (e.g. of the order of tens of volts) may be applied to the (electrode(s) of the) drift focusing lens when the ions are caused to travel from the deflector to the detector for detection. The third voltage may be configured such that the ions are properly focused onto the detector.

In embodiments, the method may comprise switching operation of the analyser between the zoom mode of operation and the other ("normal", non-zoom) mode of operation by controlling (adjusting) the (voltage(s) applied to the) deflector only, e.g. without adjusting other voltages and without affecting the drift focus of the analyser.

A further aspect provides a method of operating a mass spectrometer that comprises a multi-reflection time-of-flight mass analyser, the method comprising operating the multi-reflection time-of-flight mass analyser in the manner described above.

A further aspect provides a non-transitory computer readable storage medium storing computer software code which when executed on a processor performs the method(s) described above.

A further aspect provides a control system for a multi-reflection time-of-flight mass analyser, or for a mass spectrometer comprising a multi-reflection time-of-flight mass analyser, the control system configured to cause the multi-reflection time-of-flight mass analyser to perform the method(s) described above.

A further aspect provides a multi-reflection time-of-flight mass analyser, or a mass spectrometer comprising a multi-reflection time-of-flight mass analyser, comprising the control system described above.

A further aspect provides a multi-reflection time-of-flight mass analyser, comprising:

two ion mirrors spaced apart and opposing each other in a first direction X, each mirror elongated generally along a drift direction Y between a first end and a second end, the drift direction Y being orthogonal to the first direction X;

an ion injector for injecting ions into a space between the ion mirrors, the ion injector located in proximity with the first end of the ion mirrors;

a detector for detecting ions after they have completed a plurality of reflections between the ion mirrors, the detector located in proximity with the first end of the ion mirrors;

a deflector located in proximity with the first end of the ion mirrors; and a control system configured to:

(i) cause ions to be injected from the ion injector into the space between the ion mirrors, such that the ions complete a first cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(ii) cause the deflector to reverse the drift direction velocity of the ions such that the ions complete a further cycle in which the ions follow a zigzag ion path having plural (K) reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(iii) optionally repeat step (ii) one or more times; and then (iv) cause the ions to travel from the deflector to the detector for detection.

The control system may be configured to cause the ions to travel from the deflector to the detector for detection only after the ions have completed in total an odd number of cycles.

These aspects and embodiments can, and in embodiments do, include any one or more or each of the optional features described herein.

The analyser may comprise a voltage source configured to apply voltage(s) to the (electrode(s) of the) deflector. The voltage source may be configured such that the voltage applied to the deflector can be controlled (adjusted), e.g. within a range of +a few hundreds of volts. The control system may be configured to cause the deflector to reverse the drift direction velocity of the ions by causing the voltage supply to apply a voltage to the deflector, wherein the resulting electric field causes the drift direction velocity of the ions to be reversed (e.g. in the manner described above). The control system may be configured to cause the ions to travel from the deflector to the detector by causing the voltage supply to remove or not apply a voltage to (or to apply a suitably small voltage to) the deflector, wherein the resulting electric field (or absence of electric field) does not cause the drift direction velocity of the ions to be substantially altered.

A further aspect provides a mass spectrometer comprising the multi-reflection time-of-flight mass analyser described above.

The mass spectrometer may comprise an ion source. Ions may be generated from a sample in the ion source. The ions may be passed from the ion source to the analyser via one or more ion optical devices arranged between the ion source and the analyser.

The one or more ion optical devices may comprise any suitable arrangement of one or more ion guides, one or more lenses, one or more gates, and the like. The one or more ion optical devices may include one or more transfer ions guides for transferring ions, and/or one or more mass selector or filters for mass selecting ions, and/or one or more ion cooling ion guides for cooling ions, and/or one or more collision or reaction cells for fragmenting or reacting ions, and so on. One or more or each ion guide may comprise a multipole ion guide such as a quadrupole ion guide, hexapole ion guide, etc., a segmented multipole ion guide, a stacked ring type ion guide, and the like.

In particular embodiments, the mass spectrometer comprises a mass filter arranged between the ion source and the analyser. The mass filter may be configured to mass select ions, such that the ions received by the injector and injected into the analyser are within a selected mass to charge ratio (m/z) range. The mass to charge ratio (m/z) range may be selected such that ions injected into the analyser can only complete in total an odd number of cycles (and not an even number of cycles) before travelling from the deflector to the detector.

DESCRIPTION OF THE DRAWINGS

Various embodiments will now be described in more detail with reference to the accompanying Figures, in which.

DETAILED DESCRIPTION

Figure 1:
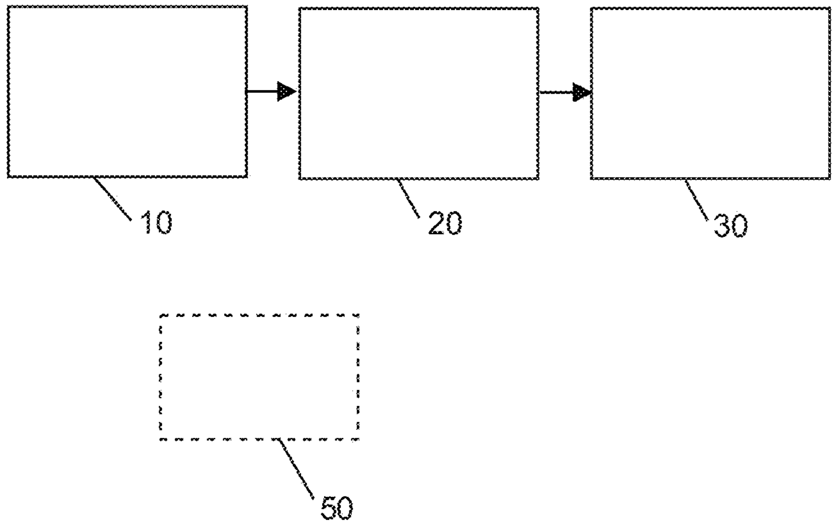
FIG. 1 shows schematically a mass spectrometer in accordance with embodiments.

FIG. 1 illustrates schematically a mass spectrometer that may be operated in accordance with embodiments. As shown in FIG. 1, the mass spectrometer includes an ion source 10, one or more ion transfer stages 20, and a multi-reflection time-of-flight (MR-ToF) mass analyser 30.

The ion source 10 is configured to generate ions from a sample. The ion source 10 can be any suitable continuous or pulsed ion source, such as an electrospray ionisation (ESI) ion source, a MALDI ion source, an atmospheric pressure ionisation (API) ion source, a plasma ion source, an electron ionisation ion source, a chemical ionisation ion source, and so on. More than one ion source may be provided and used. The ions may be any suitable type of ions to be analysed, e.g. small and large organic molecules, biomolecules, DNA, RNA, proteins, peptides, fragments thereof and the like.

The ion source 10 may be coupled to a separation device such as a liquid chromatography separation device or a capillary electrophoresis separation device (not shown), such that the sample which is ionised in the ion source 10 comes from the separation device.

The ion transfer stage(s) 20 are arranged downstream of the ion source 10 and may include an atmospheric pressure interface and one or more ion guides, lenses and/or other ion optical devices configured such that some or all of the ions generated by the ion source 10 can be transferred from the ion source 10 to the analyser 30. The ion transfer stage(s) 20 may include any suitable number and configuration of ion optical devices, for example optionally including one or more RF and/or multipole ion guides, one or more ion guides for cooling ions, one or more mass selective ion guides, and so on.

The mass analyser 30 is arranged downstream of the ion transfer stage(s) 20 and is configured to receive ions from the ion transfer stage(s) 20. The mass analyser is configured to analyse the ions so as to determine their mass to charge ratio and/or mass, i.e. to produce a mass spectrum of the ions. The mass analyser 30 is a multi-reflecting time-of-flight (MR-ToF) mass analyser (as described further below).

It should be noted that FIG. 1 is merely schematic, and that the mass spectrometer can, and in embodiments does, include any number of one or more additional components. For example, in particular embodiments, the mass spectrometer includes a collision or reaction cell. The instrument may include a single mass analyser, or more than one (e.g. two) mass analysers.

As also shown in FIG. 1, the mass spectrometer is under the control of a control unit 50, such as an appropriately programmed computer, which controls the operation of various components of the spectrometer and, for example, sets the voltages to be applied to the various components of the spectrometer including the analyser 30. The control unit 50 may also receive and process data from various components including the detector(s).

Figure 2:
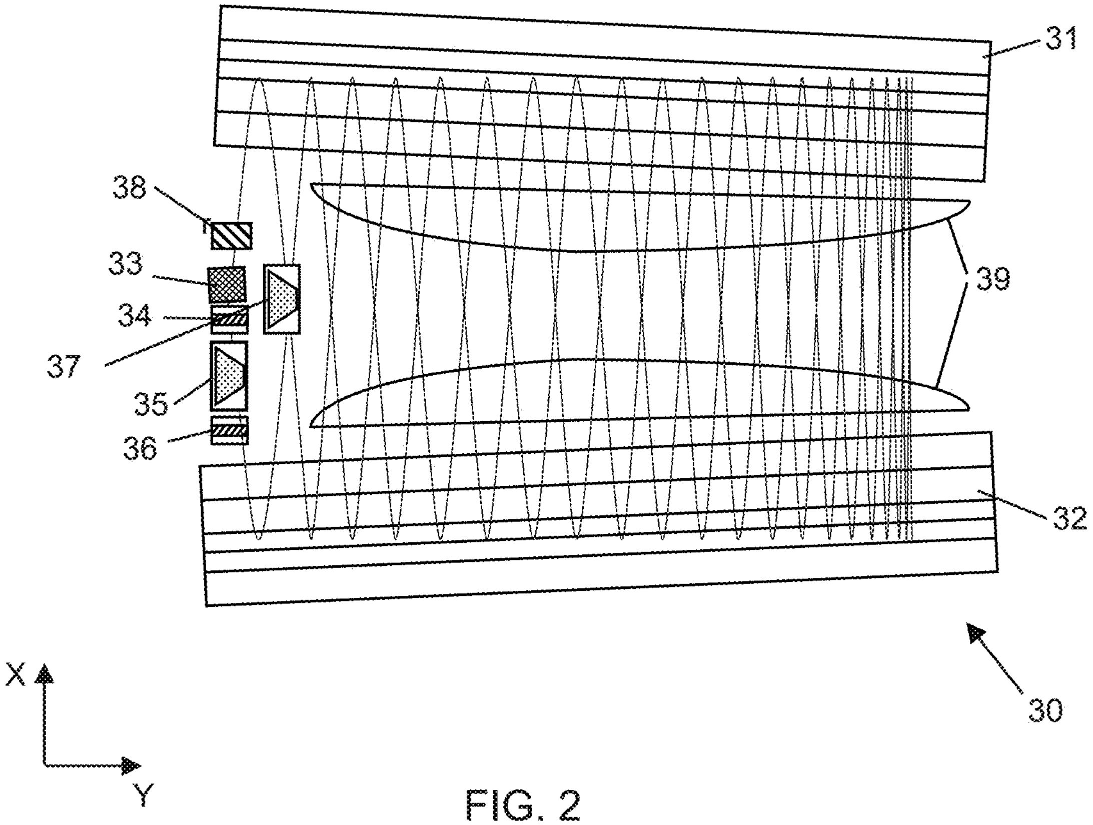
FIG. 2 shows schematically a multi-reflection time-of-flight mass analyser in accordance with embodiments.
Figure 3:
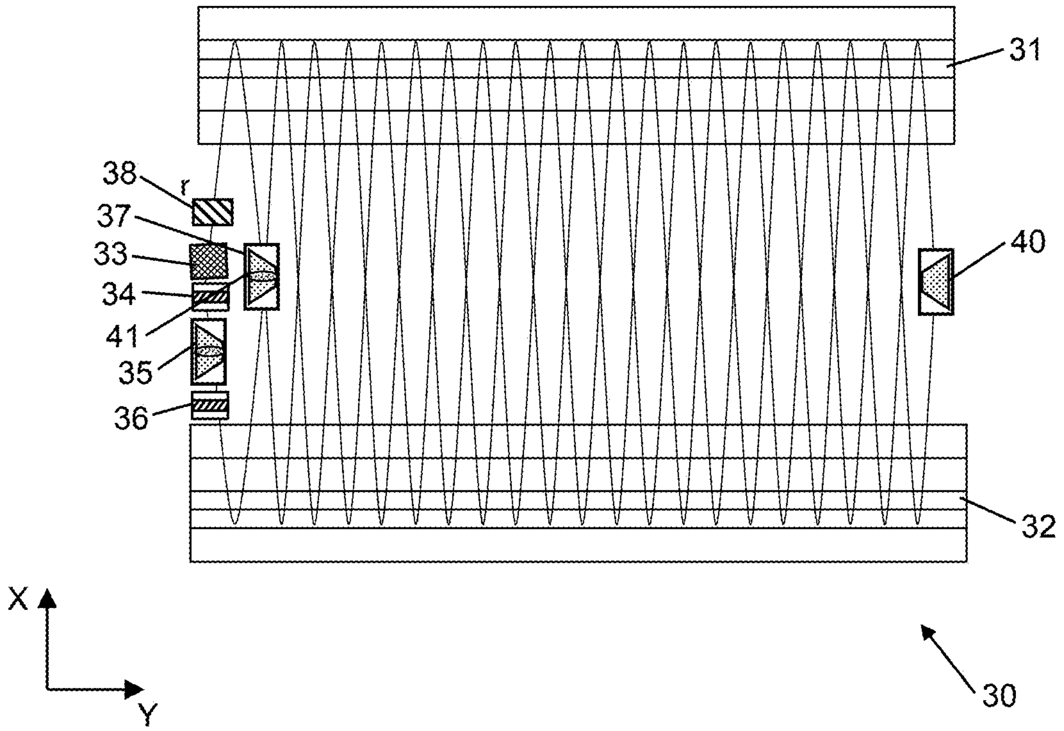
FIG. 3 shows schematically a multi-reflection time-of-flight mass analyser in accordance with embodiments.

FIGS. 2 and 3 illustrate schematically detail of embodiments of the mass analyser 30. As shown in FIGS. 2 and 3, the multi-reflection time-of-flight analyser 30 includes a pair of ion mirrors 31, 32 that are spaced apart and face each other in a first direction X. The ion mirrors 31, 32 are elongated along an orthogonal drift direction Y.

An ion source (injector) 33, which may be in the form of an ion trap, is arranged at one end (the "first" end) of the analyser. The ion source 33 may be arranged and configured to receive ions from the ion transfer stage(s) 20. Ions may be accumulated in the ion source 33, before being injected into the space between the ion mirrors 31, 32. As shown in FIGS. 2 and 3, ions may be injected from the ion source 33 with a relatively small injection angle or drift direction velocity, creating a zig-zag ion trajectory, whereby different oscillations between the mirrors 31, 32 are separate in space.

One or more lenses and/or deflectors may be arranged along the ion path, between the ion source 33 and the ion mirror 32 first encountered by the ions. For example, as shown in FIGS. 2 and 3, a first out-of-plane lens 34, an injection deflector 35, and a second out-of-plane lens 36 may be arranged along the ion path, between the ion source 33 and the ion mirror 32 first encountered by the ions. Other arrangements would be possible. In general, the one or more lenses and/or deflectors may be configured to suitably condition, focus and/or deflect the ion beam, i.e. such that it is caused to adopt the desired trajectory through the analyser 30.

The analyser also includes another deflector 37, which is arranged along the ion path, between the ion mirrors 31, 32. As shown in FIGS. 2 and 3, the deflector 37 may be arranged approximately equidistant between the ion mirrors 31, 32, along the ion path after its first ion mirror reflection (in ion mirror 32), and before its second ion mirror reflection (in the other ion mirror 31).

The analyser also includes a detector 38. The detector 38 may be any suitable ion detector configured to detect ions, and e.g. to record an intensity and time of arrival associated with the arrival of ion(s) at the detector. Suitable detectors include, for example, one or more conversion dynodes, optionally followed by one or more electron multipliers, and the like.

In its "normal" mode of operation, ions are injected from the ion source 33 into the space between the ion mirrors 31, 32, in such a way that the ions adopt a zigzag ion path having plural reflections between the ion mirrors 31, 32 in the X direction, whilst: (a) drifting along the drift direction Y from the deflector 37 towards the opposite (second) end of the ion mirrors 31, 32, (b) reversing drift direction velocity in proximity with the second end of the ion mirrors 31, 32, and then (c) drifting back along the drift direction Y to the deflector 37. The ions are then caused to travel from the deflector 37 to the detector 38 for detection.

In the analyser of FIG. 2, the ions mirrors 31, 32 are both tilted with respect to the X and/or drift Y direction. It would instead be possible for only one of the ion mirrors 31, 32 to be tilted, and e.g. for the other one of the ion mirrors 31, 32 to be arranged parallel to the drift Y direction. In general, the ion mirrors are a non-constant distance from each other in the X direction along their lengths in the drift direction Y. The drift direction velocity of ions towards the second end of the ion mirrors is opposed by an electric field resulting from the non-constant distance of the two mirrors from each other, and this electric field causes the ions to reverse their drift direction velocity in proximity with the second end of the ion mirrors and drift back along the drift direction towards the deflector.

The analyser depicted in FIG. 2, further comprises a pair of correcting stripe electrodes 39. Ions travelling down the drift length are slightly deflected with each pass through the mirrors 31, 32 and the additional stripe electrodes 39 are used to correct for the time-of-flight error created by the varying distance between the mirrors. For example, the stripe electrodes 39 may be electrically biased such that the period of ion oscillation between the mirrors is substantially constant along the whole of the drift length (despite the non-constant distance between the two mirrors). The ions eventually find themselves reflected back down the drift space and focused at the detector 38.

Further detail of the tilted-mirror type multireflection time-of-flight mass analyser of FIG. 2 is given in U.S. Pat. No. 9,136,101, the contents of which are incorporated herein by reference.

In the analyser of FIG. 3, the ion mirrors 31, 32 are parallel to each other. In this embodiment, in order to cause the ions to reverse their drift direction velocity in proximity with the second end of the ion mirrors and drift back along the drift direction towards the deflector, the analyser includes a second deflector 40 at the second end of the ion mirrors 31, 32.

As also shown in FIG. 3, in this embodiment, a lens 41 can be included in the injection deflector 35 and/or in the deflector 37. The ion beam is allowed to expand a short way into the analyser before meeting a long-focus lens 41, which has the effect of focusing the ion beam along its length. The lens 41 may be an elliptical drift focusing (converging) lens mounted within the deflector 37. The second deflector 40, which may also include a lens, is used to reverse the beam direction whilst maintaining control of focal properties.

Further detail of the single-lens type multireflection time-of-flight mass analyser of FIG. 3 is given in UK patent No. GB 2,580,089, the contents of which are incorporated herein by reference.

The analysers depicted in FIGS. 2 and 3 both differ from the analyser described in the article A. Verenchikov, et al., in that the ion beam is allowed to spread out relatively broadly for most of its flight path. In contrast, the Verenchikov analyser includes a set of periodic lenses that function to keep the ion beam focused along its flight path. A significant advantage of allowing the ion beam to spread out broadly for most of its flight path is that space charge effects are reduced, which can be a significant problem for time-of-flight analysers.

It can be desirable to increase the resolution of the analyser, both to increase the separation of analyte ions and to improve their accurate mass assignment. Generally, an analyser's resolution is limited by the length of the ion flight path through the analyser, and the arrival time spread of ions at the detector. Longer ion flight paths allow higher resolution. For low m/z ions, this benefit is particularly important as it minimises the impact of the detector time response, that normally causes a substantial drop off in resolution at lower m/z.

Embodiments provide a multi-pass "zoom" method, particularly for the analyser types depicted in FIGS. 2 and 3. The deflector 37 at the front of the analyser, which is normally used to reduce the injection angle and/or optimise the number (K) of oscillations within a single drift pass, is (also) used to enable a multi-pass "zoom" mode of operation. The applied voltage on this deflector 37 is switched between a "normal" ion inject/extraction mode, and a drift reversing trapping mode.

As described above, in these classes of analyser, the ion beam is relatively broad in the drift dimension Y, often around 10 mm, depending on the focal quality. This leads to a requirement that the deflector 37 should be able to accept such a wide beam without introducing clipping or uneven deflection.

Figure 4:
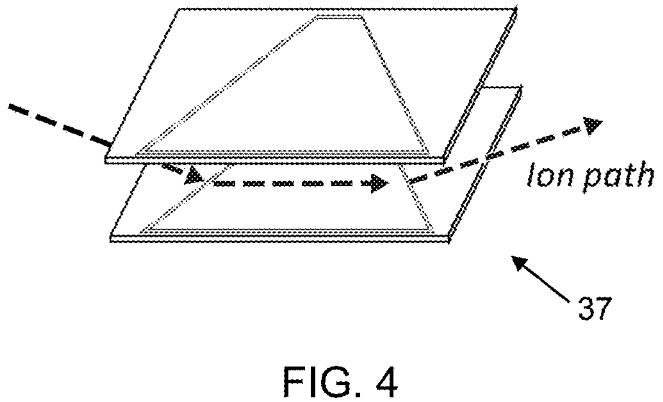
FIG. 4 shows schematically a deflector for a multi-reflection time-of-flight mass analyser in accordance with embodiments.

As shown in FIG. 4, a suitable deflector design is a trapezoid shaped or prism-like deflector. The deflector 37 comprises a trapezoid shaped or prism-like electrode arranged above the ion beam and another trapezoid shaped or prism-like electrode arranged below the ion beam. The electrodes are angled with respect to the ion beam. Ions experience a relatively strong electric field at the edges of the angled electrodes, inducing a deflection. The electrodes are located out-of-plane of the deflection, thereby allowing them to be easily made to be broad enough to accept a wide ion beam (at least compared to more conventional deflection plates that would sit at either side of the beam).

The applied voltage on the deflector 37 is switched between a normal ion inject/extraction mode, and a drift reversing trapping mode. This requires that the power supply driving the deflector 37 should be extremely fast. Ions that are within the deflector 37 during the voltage switching period may be incorrectly deflected and scattered or lost. The switching time to and from trapping mode creates dead margins in the time-of-flight spectrum, reducing the accessible mass range. For typical drift pass times of 0.1-2 ms, typical power supplies that require milliseconds to switch are not sufficient.

Fast voltage amplifiers may feasibly switch across several hundred volts in tens to hundreds of milliseconds and require careful design and tuning to optimise. Transistor based switches are the fastest available and switching times of tens of nanoseconds become achievable.

Figure 5:
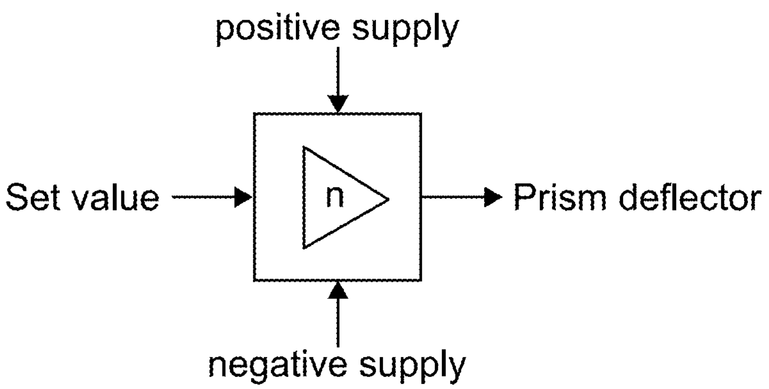
FIG. 5 shows schematically a power supply for a deflector of a multi-reflection time-of-flight mass analyser in accordance with embodiments.

As depicted in FIG. 5, one suitable solution for such a power supply would be the AB-type amplifier. These types of amplifiers have a good linearity and can deliver enough current through their push-pull design to drive the load capacitance formed by the prism deflector 37 within the required time. In addition, they have a bipolar design, which can provide both positive and negative output voltages, required for positive or negative ion mode. Nevertheless, other amplifier designs could instead be used.

Furthermore, the supplied voltage should be regulated for proper function of the prism deflector 37 and switching speed. For higher voltages of the prism deflector 37, an amplifier output stage with cascaded transistor can be used to reach the desired voltage range.

Figure 6:
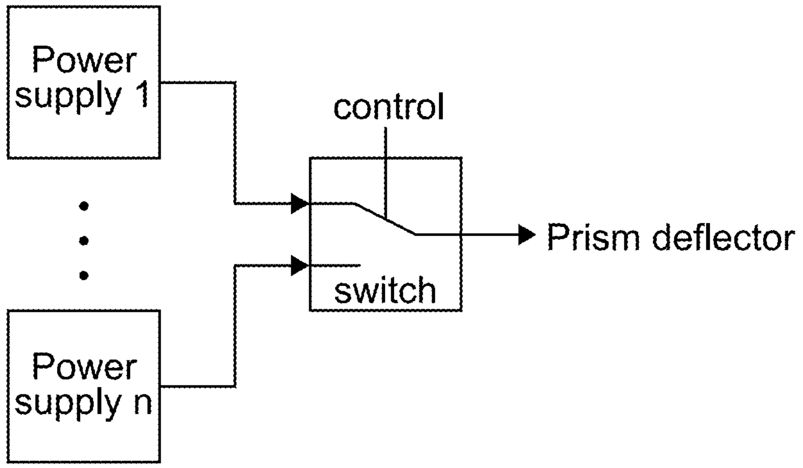
FIG. 6 shows schematically a power supply for a deflector of a multi-reflection time-of-flight mass analyser in accordance with embodiments.

As depicted in FIG. 6, another option to supply the different, quickly changing voltages required for the prism deflector 37 is to use plural different pre-regulated voltage sources, and to switch between them. For example, International patent application No. WO 2009/144469 (the contents of which are incorporated herein by reference), describes two continuously operating power supplies connected via a controlled switch to a mass analyser. One power supply provides a positive voltage, while the second one provides a negative voltage. For the prism deflector 37, more than one voltage is required, where every power supply can have any voltage and polarity independent from each other. In addition, the timing, or how long one specific power supply is connected via the switch to the prism deflector 37, should not be limited or predefined and should be dynamically set by control of the switch.

Two methods are provided to reverse the ion drift velocity at the deflector 37.

Figure 7:
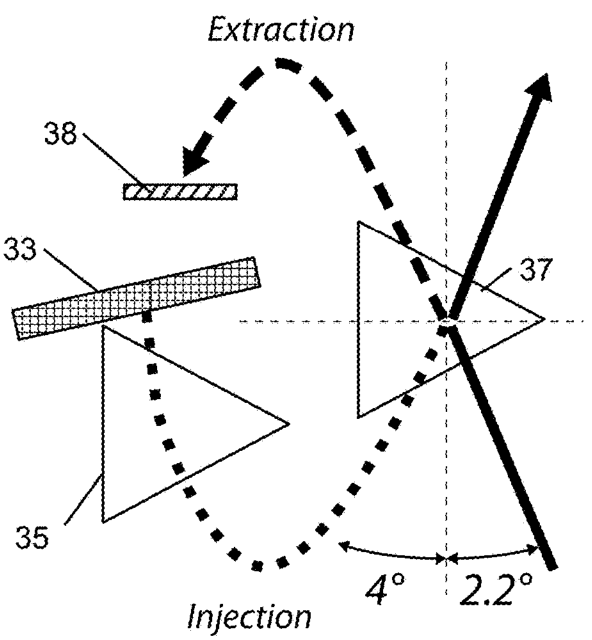
FIG. 7 illustrates schematically a method of operating a multi-reflection time-of-flight mass analyser in accordance with embodiments.

The first is depicted in FIG. 7. In this embodiment, the deflector 37 is switched to a voltage so that ions are completely redirected within a single pass through the deflector 37, and then switched back after a defined period to allow ions to be extracted. This is referred to herein as a "single step" method. For 4 KV ions, the deflector voltage would be approximately +150V for ion injection/extraction and approximately +300V for trapping.

However, a particular problem with this mode of operation is that a time-of-flight perturbation is created by each deflection, which manifests as a tilting of the ions' focal plane and severely limits resolving power. An ion that crosses the deflector 37 at its widest part experiences a greater time-of-flight shift than an ion that crosses the deflector 37 at its narrowest part. As a result, the deflector 37 introduces a correlation between an ion's drift coordinate Y and its time of arrival at the detector 38. The Verenchikov analyser does not suffer from this problem as the beam is always very narrow.

Several methods are possible to counter the tilting of the ToF front.

Firstly, a tilt correcting device could be installed at the detector 38. These have been described, for example in UK patent no. GB 2,575,169, and UK patent no GB 2,543,036, as tuneable deflectors that induce an opposite time-of-flight error to that of the analyser's deflector 37. This has the disadvantage that whilst it can compensate the error of even numbers of drift passes, it will induce error in the odd number.

A second method would be to install a lens adjacent to the deflector 37 to focus the beam within it, and thus eliminate the error source. However, this comes at the cost of greatly reducing the freedom to move the ion beam, inhibiting tuning and tightening already very strict mechanical tolerances.

A third method would be to induce a compensating ToF error by deliberately detuning the analyser. For example, the effect of small misalignments in mirror tilt is to unbalance the ToF perturbations created by tilt and stripe electrodes 39, resulting in a net a time error along the width of the beam. A deliberate mis-tilting of the mirrors 31, 32, setting prism/stripe voltages to induce an incorrect number of oscillations per drift cycle, or the effect of an added linear correction stripe should be able to compensate the deflector's ToF perturbation within each cycle. However, a drawback is that the first drift pass would then have an uncompensated error, requiring either a tilt corrector or turning of the detector to match.

It has been recognised that these three methods would affect the "normal" (non-zoom) mode of operation, and so would hinder or complicate switching of the analyser between the normal and zoom modes.

In accordance with some embodiments, the analyser is drift focused, and a second drift reflection is used to produce a time-of-flight error which cancels out the first. This occurs because the relative drift position of ions entering the deflector 37 are inverted after drift reflection. In other words, two deflections in a row (separated by a drift reflection at the second end of the ion mirrors 31, 32) are used to substantially cancel the corresponding aberrations of one another. This compensation happens because the drift reflection reverses the Y-order of ions, and so an ion which crossed the deflector 37 at its narrow part on a first pass crosses the wider part of the deflector 37 on the second pass (and vice versa). Thus, in embodiments, the ions are caused to complete in total an odd number of cycles, i.e. such that the drift direction velocity of the ions is reversed by the deflector 37 in total an even number of times.

Figure 8:
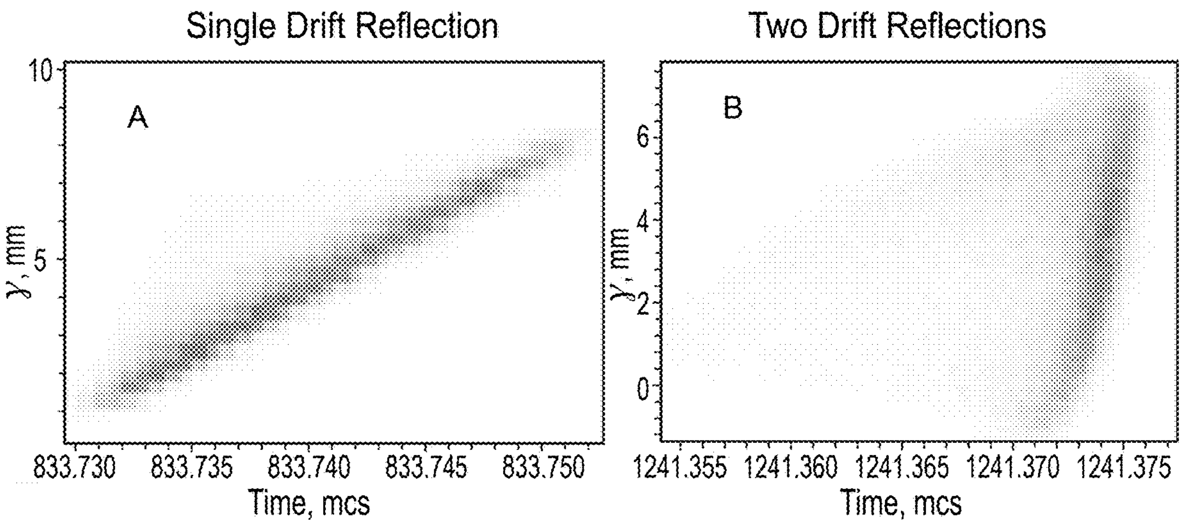
FIG. 8A shows an arrival time distribution of m/z 200 ions across the length of the detector of the multi-reflection time-of-flight mass analyser of FIG. 2 when operated with only a signal drift reflection.
FIG. 8B shows an arrival time distribution of m/z 200 ions across the length of the detector of the multi-reflection time-of-flight mass analyser of FIG. 2 when operated with two drift reflections in accordance with embodiments.

The analyser shown in FIG. 2 was modelled in MASIM3D, and FIG. 8 shows the simulated ion arrival time distribution across the length of the detector when either one or two drift reflections were performed. It is clear that for a single reflection the ion arrival spread is broad (low resolution) and highly correlated with the detector position Y, indicating a strong tilt of the ToF front. For the two-reflection example, the time distribution is very narrow (high resolution) and weakly correlated with position on the detector.

The second method of reversing the ions drift velocity is to set the deflector 37 to a voltage that removes the ion's drift velocity. Then, the ions pass into a mirror and are reflected straight back into the deflector 37, where they receive a deflection such that they complete their drift reflection. Because ions re-enter the deflector 37 at near enough where they left it, the time-of-flight perturbation induced by the first step is compensated by the second.

Figure 9:
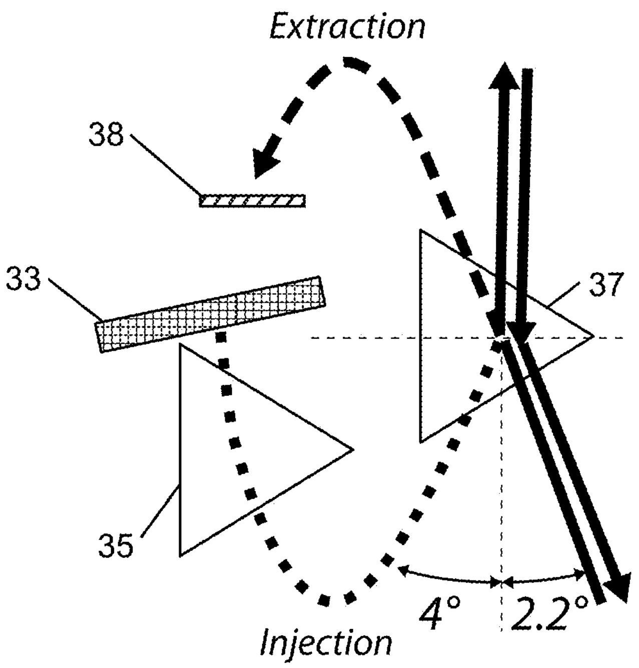
FIG. 9 illustrates schematically a method of operating a multi-reflection time-of-flight mass analyser in accordance with embodiments.

This method is depicted in FIG. 9. This method addresses the problem of a large ToF perturbation ("at source"), but adds a new problem in that it creates an additional half oscillation between the mirrors 31, 32. The consequence of this is that after the first drift reflection, ions return to the deflector 37 from the opposite side in the X direction, and cannot be extracted to the detector 38, only unhelpfully to the ion source 33. Thus, a second drift reflection is required to allow ions to approach the prism 37 with the correct orientation for extraction. Thus, the method is again limited to an odd number of drift passes, and will remove ions with an even number of drift passes.

As described above, the deflector 37 can include an elliptical drift focusing (converging) lens 41 mounted within the deflector 37. In this case, the voltage applied to the electrodes of the lens 41 may be controlled independently of the voltage applied to the electrodes of the deflector 37. A second voltage supply, e.g. configured as described above with respect to FIGS. 5 and 6, may be provided for this purpose. The voltage applied to the lens 41 may be switched between the injection, zoom and extraction modes. This is because the voltage needed to near-collimate the rapidly expanding beam from the source 33 can be very different to that needed to maintain that collimation for a further cycle. For example, a voltage of around 60 V may be applied to the lens 41 during the zoom mode, whereas a voltage of around 100-250V may be applied to the lens 41 for the initial collimation. The voltage applied to the lens 41 may also be altered for the extraction stage, e.g. so that the beam is not collapsed to a very small spot at the detector 38, or too small a spot for the optional tilt corrector to work well.

Figure 10:
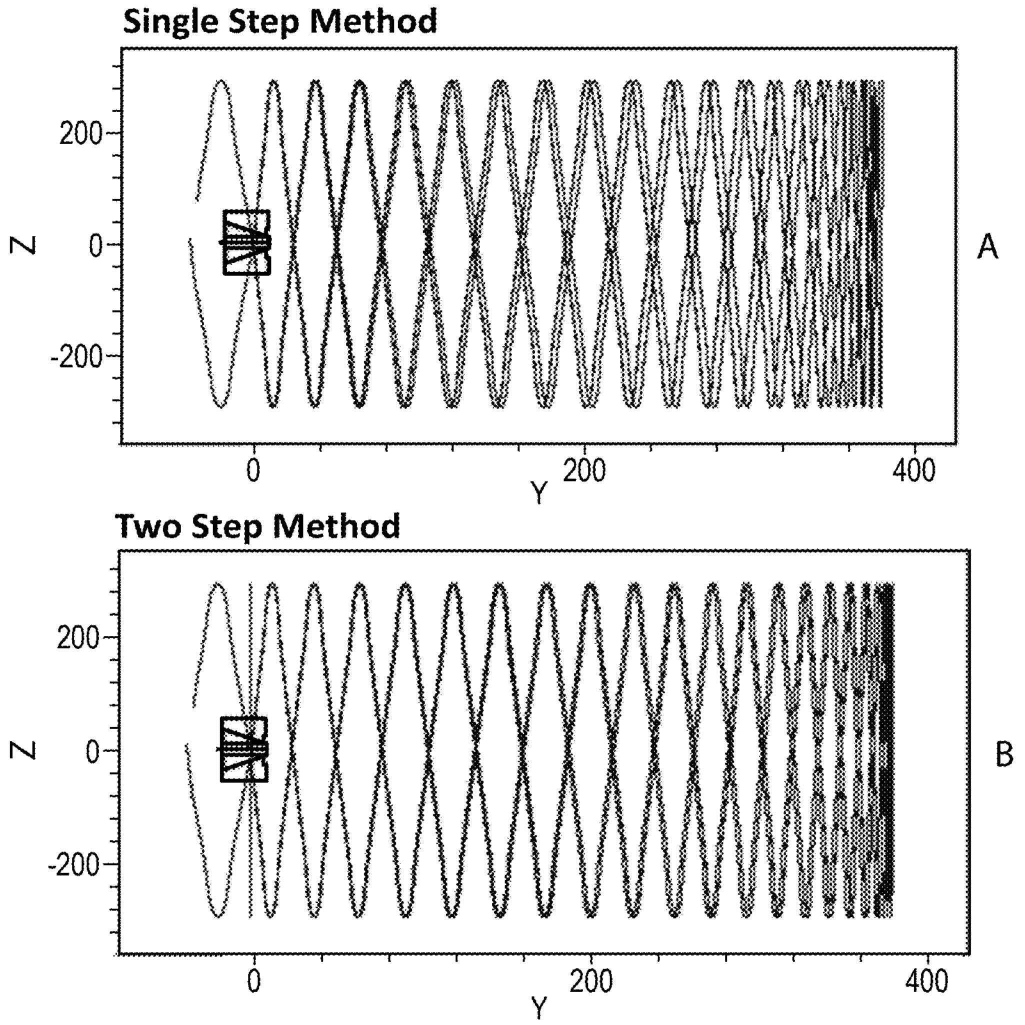
FIG. 10A shows simulated trajectories of m/z 200 ions through a multi-reflection time-of-flight mass analyser being operated in accordance with the method of FIG. 7.
FIG. 10B shows simulated trajectories of m/z 200 ions through a multi-reflection time-of-flight mass analyser being operated in accordance with the method of FIG. 9.

Trajectories for the two zoom methods were simulated in MASIM3D for a tabletop size tilted mirrors analyser with three passes through a 20 m flight path and are shown in FIG. 10. Slight deviations in tuning cause imperfect overlap of the different drift passes but is easily within tolerance of the system.

Figure 11:
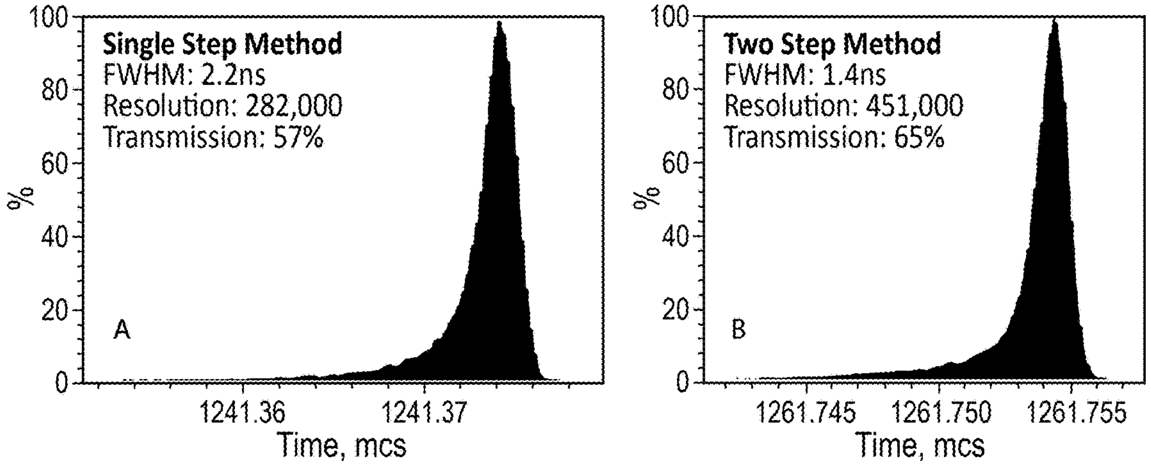
FIG. 11A shows simulated ion peaks for m/z 200 ions determined using a multi-reflection time-of-flight mass analyser being operated in accordance with the method of FIG. 7.
FIG. 11B shows simulated ion peaks for m/z 200 ions determined using a multi-reflection time-of-flight mass analyser being operated in accordance with the method of FIG. 9.

Simulated m/z 200 peaks for the two processes are shown in FIG. 11. In both cases a small 10 mm long diaphragm is used at the prism deflector and transmission is calculated from ions lost there. The vast majority of transmission losses occur at injection. Both processes generate very high resolution: 280K for the single step and 450K for the two-step method based on full-width-half-maximum, but produce some pre-pulse fronting.

As described above, to operate the analyser in the zoom mode, the voltage applied to the deflector 37 is switched between a "normal" ion inject/extraction mode, and a drift reversing trapping mode. This must be done with precise timing to ensure that the ions complete the desired number of cycles before being extracted to the detector 38.

The ion path depicted in FIG. 10A (single step method) is made by all ions with the mass to charge ratio in the range from $(m/z)_1$ to $(m/z)_2$. The deflector 37 is to be switched from Mode 1 (deflection from source 33 to the loop) to Mode 2 (deflection from loop back to the loop) and finally to the Mode 3 (deflection from the loop to the detector 38). The switching times will be denoted as $t_{12}$ and $t_{23}$, respectively. The zero time is assumed to be the moment of injection.

The first switching between Modes 1 and 2 should happen not earlier than the heaviest ion $(m/z)_2$ passes the deflector 37 for the first time, and not later than the lightest ion $(m/z)_1$ makes $a_0+K$ oscillations, where K is the number of oscillations per loop (between subsequent passages of the deflector 37) and $a_0$ represents a portion of an oscillation before the ion source 33 and the first passage of the deflector 37. Otherwise, the lightest ions will not be set to the next loop properly. This gives the double inequality:

$$a_0T_2 \leq t_{12} \leq (a_0+K)T_1 \tag{a}$$

where $T_1$ and $T_2$ are the times of oscillation for lightest and the heaviest ions correspondingly. In the embodiment of FIG. 7 $a_0 \approx 1/2$.

The second switching from Mode 2 to Mode 3 should happen not earlier than the heaviest ion makes $a_0+(N-1)K$ oscillations, where N is the intended number of loops. Otherwise, the heaviest ion will exit the loop before all loops are made. On the other hand, the second switching should be not later than the lightest ion makes $a_0+NK$ oscillations, otherwise this ion will stay in the analyser for the next, unwanted, loop. This double inequality reads:

$$(a_0+NK-K)T_2 \leq t_{23} \leq (a_0+NK)T_1 \tag{b}$$

Both inequalities (a) and (b) impose upper bounds for the ratio of $T_2$ and $T_1$ under which for a pair $t_{12}$ and $t_{23}$ exists; and the bound from (b) is stronger (lower) than that from (a) for any N>1:

$$\frac{T_2}{T_1} \leq \left(\frac{T_2}{T_1}\right)_{max} = \frac{a_0+NK}{a_0+NK-K}$$

As the time of flight is proportional to the square root of m/z, this inequality translates directly to the maximum unambiguous mass range (UMR) as:

$$\frac{(m/z)_2}{(m/z)_1} \leq UMR = \left(\frac{a_0+NK}{a_0+NK-K}\right)^2$$

To realize the full UMR, the switching time $t_{23}$ must be:

$$t_{23}=(a_0+NK)T_1=(a_0+NK-K)T_2$$

The first switching time leaves some freedom to define. It may be assumed, for example, its minimal possible value may be adopted $t_{12}=a_0T_2$, which allows for electronic ripples before the lightest ion comes to the deflector for the next time.

Table 1 shows simulations of a mass analyser with a 1.25 m effective oscillation distance and 20 oscillations per loop. The resolution is calculated in terms of peak full-width-half-maximum. The resolution is advantageous on every odd number of loops which involve an even number of passages of the deflector. The collapse in m/z range is, however, rather pronounced as the number of loops is increased.

TABLE 1

| No. Of loops | FWHM/ns | Resolution, K | Unambiguous Mass Range |
|---|---|---|---|
| No zoom | 1.7 | 125 | Source Limited >15× |
| 2× | 6.5 | 65 | 3.9× |
| 3× | 2.2 | 280 | 2.23× |
| 4× | 7.0 | 120 | 1.77× |
| 5× | 3.0 | 340 | 1.56× |

In embodiments, the m/z range of ions entering the analyser is limited, via use of the switchable deflector, mass filter (e.g. quadrupole mass filter), or otherwise (in the ion transfer stage(s) 20), to approximately match their m/z range to the UMR of the zoom method and remove ambiguity in m/z assignment.

It should be noted that in the two-step method, even pass ions will be lost, and so there will be less ambiguity. In other words, the two-step zoom mode removes adjacent overlapping drift reflections, improving confidence in the m/z assignment.

A mass spectrometer incorporating the analyser design of FIG. 2 was constructed. Analyte ions, m/z 524, generated from an electrospray source were isolated by a quadrupole, accumulated and cooled within an extraction ion trap, and ejected into the analyser by a 330V/mm pulsed field, under which they rapidly accelerated to 4 KV flight energy.

Ion dispersion was controlled by a pair of lenses and the ions' direction was set by the first prism deflector 35 so that ions passed through to the second prism deflector 37 via a reflection from an ion mirror 32. The second prism deflector 37 was set to −160V, to admit ions to the analyser. After ~200 μs this prism deflector was switched to +280V trapping mode, and held there for 800 μs, sufficient for the ions to make a second drift pass. The prism 37 was then switched back to −160V transmission mode, and the trapped ions were extracted to an electron multiplier detector 38.

Figure 12:
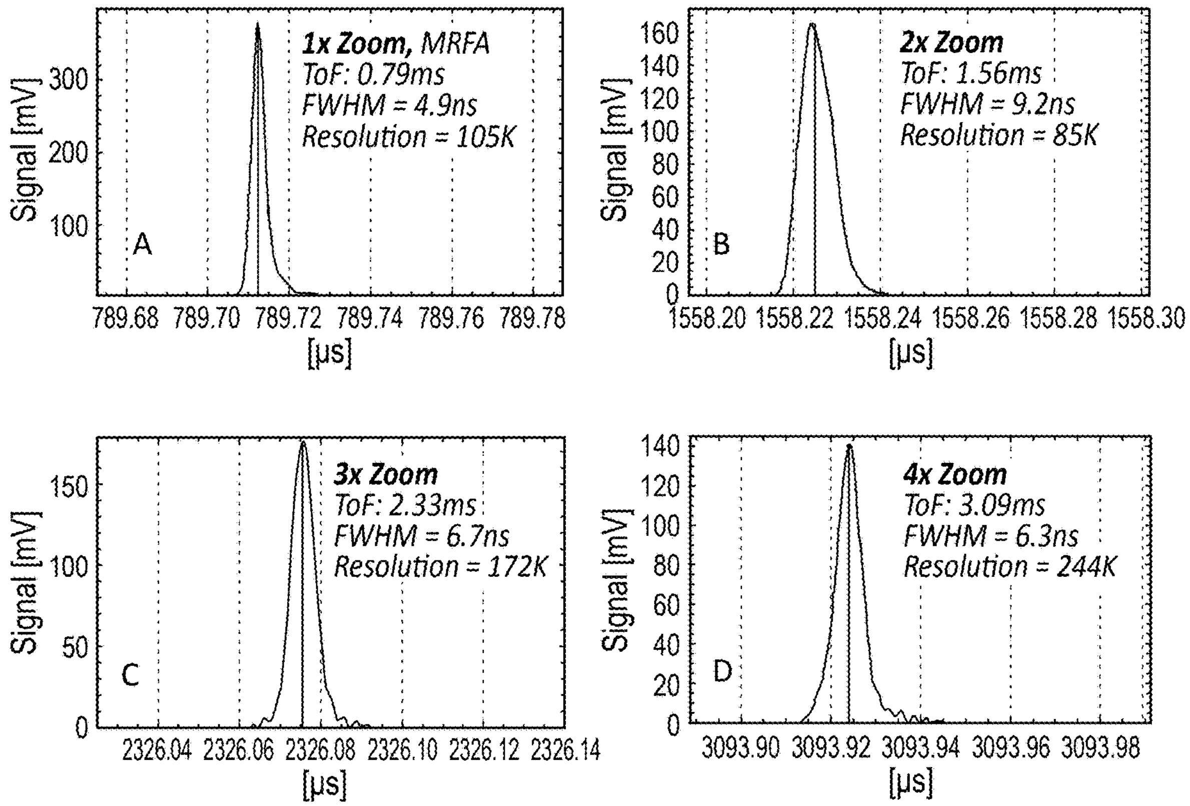
FIG. 12A shows measured ion peaks for m/z 524 ions acquired when the instrument of FIG. 2 was operated without the zoom mode.
FIGS. 12B-D show measured ion peaks for m/z 524 ions acquired when the instrument of FIG. 2 instrument was operated with the zoom mode in accordance with embodiments.

FIG. 12 shows the m/z 524 peaks acquired when the instrument was operated in single pass mode and zoom mode. Far higher resolution was observed in 3× zoom mode without great loss of signal, although higher numbers of drift passes were observed to more substantially reduce transmission.

Figure 13:
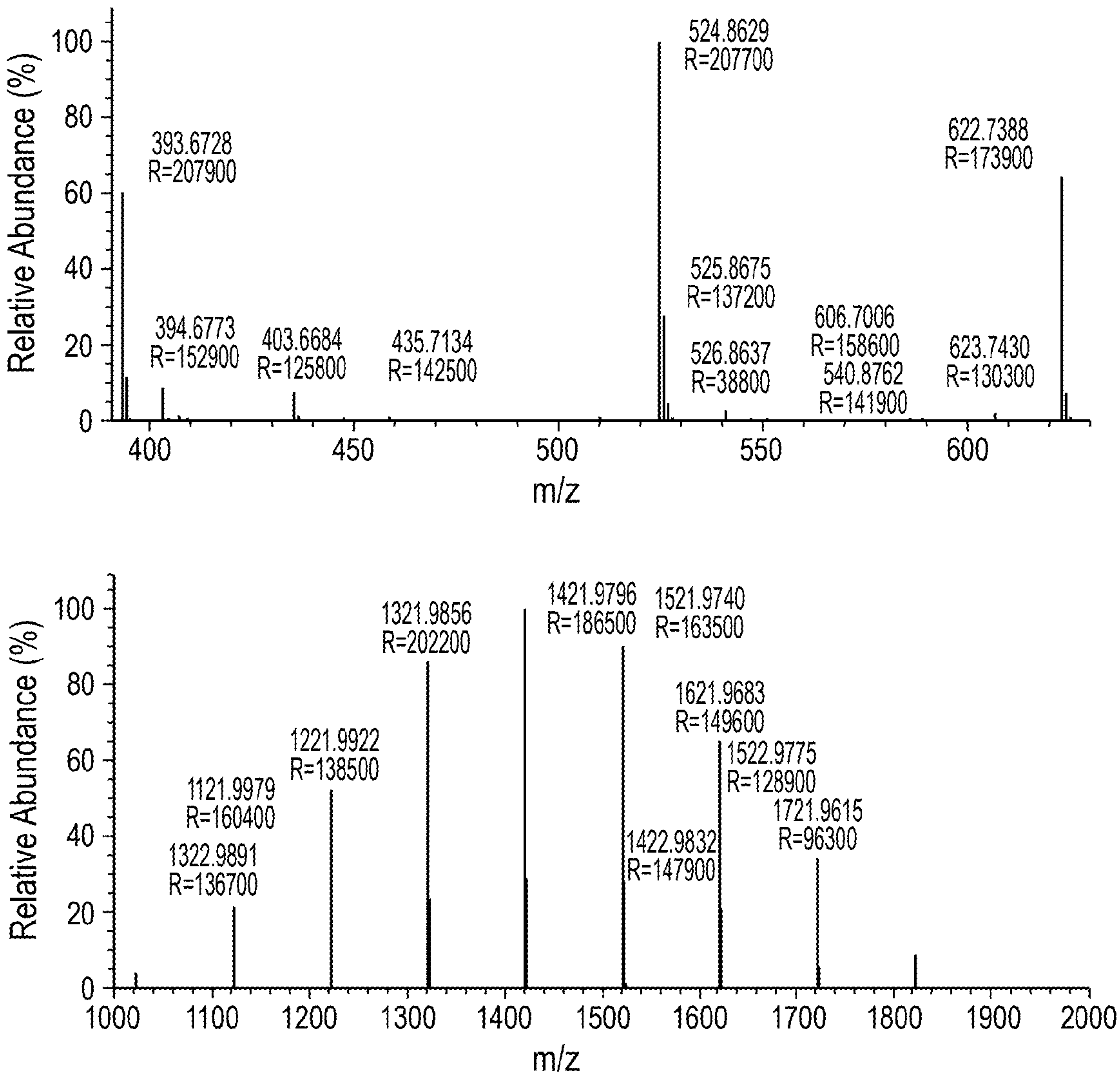
FIG. 13 shows mass spectra of a calibration solution obtained using a zoom mode in accordance with embodiments.

FIG. 13 shows zoom mode mass spectra of infused of Pierce Flexmix® calibration solution, a common calibration mixture containing MRFA and Ultramark. In this example, the ion mass ranges delivered to the ToF analyser were first isolated by a resolving quadrupole to remove ambiguous peaks. An approximately 1.6×m/z range was observed from first mass 390.

As described above, in embodiments, the switch between ion injection/extraction and ion trapping modes is performed by switching the voltage of the deflector 37, e.g. from approximately −140 to approximately +300V.

As also described above, in some embodiments, e.g. as shown in FIG. 3, the deflector 37 includes a drift focusing (converging) lens or "dispersion lens" 41 mounted within the deflector 37. In these embodiments, an additional switched voltage may be applied to the drift focusing lens 41. This allows the dispersion lens 41 to switch from the (e.g. approximately −145V) potential (relative to surroundings) required to near-collimate the expanding pulse-extracted ion beam, to the (e.g. approximately −15V) potential required to merely maintain the collimation for another pass.

Whilst either of these potentials are suited to release ions to the detector 38, the latter lower potential (e.g. approximately −15V) may be beneficial so as not to tightly focus the beam to a tilt correcting device, which has been found to be beneficial to maintain resolution when beam reversal is utilised.

Figure 14:
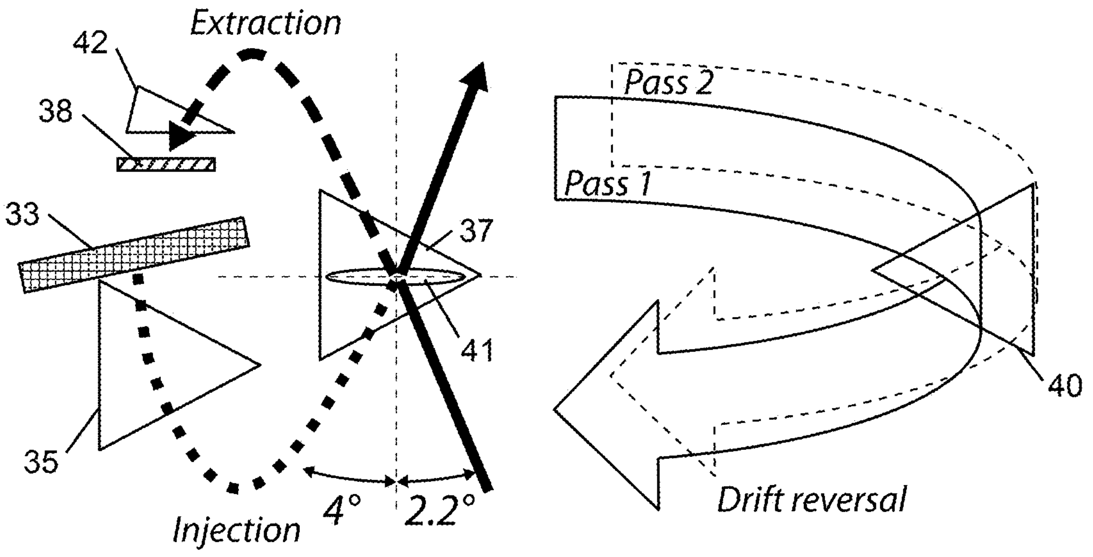
FIG. 14 illustrates schematically a method of operating a multi-reflection time-of-flight mass analyser in accordance with embodiments.

FIG. 14 shows a simplified schematic diagram of the analyser depicted in FIG. 3. The analyser further includes a tilt correcting device 42 arranged adjacent to the detector 38. The tilt corrector 42 may be a wedged deflector, e.g. as is described in U.S. Pat. No. 11,158,494, the contents of which is incorporated herein by reference.

As described above, in regular operation, ions are pulse-extracted from the ion trap 33 at a slight angle (e.g. approximately) 2°, accelerated to a (e.g. approximately 4KeV) flight energy, and a prism-like deflector 35 (e.g. held at a potential of approximately +125V) increases the angle (e.g. to approximately) 4° with the purpose of ensuring that the ion time front enters the deflector 37 relatively flat with respect to the drift axis. After passing around the corner of the injection optics, the deflector 37 (e.g. held at a potential of approximately −140V) reduces the injection angle to a level more suited for multiple oscillations (e.g. approximately) 2.2°.

Alternatively, the ion trap 33 may be turned back to a substantial negative angle (e.g. approximately)−3°, so that the ion time front exits the deflector 37 flat with respect to the drift axis, rather than enters flat. This removes the need for the deflector 37 to self-compensate when returning ions exit, improving focal plane quality. However, it also means that ions exit the drift region with a tilted time front, requiring use of either a tilt corrector 42 or a deliberate angled alignment of the detector 38.

The pulse-extracted ions are focused out-of-plane by a pair of rectangular einzel lenses build into the injection optics. A drift focusing lens (e.g. held at a potential of approximately +750V) built into the injection prism 35, serves to expand the initially narrow (e.g. approximately ~1 mm) ion beam to an increased breadth (e.g. approximately ~12 mm) so that the drift focusing lens 41 (e.g. held at a potential of approximately −145V) may more completely collimate it. True collimation cannot be achieved, and in practise the beam is set to slightly converge, passing through a minimum width and then re-expanding until it reaches the far end of the drift region where it encounters the reversing deflector 40. This deflector (e.g. held at a potential of approximately +300V) sets the beam direction back, whilst a drift focusing lens built into the third deflector 40 (e.g. held at a potential of approximately −15V) reverts the collimated beam from slowly expanding back to a slow convergence. This lens is not strictly necessary, as only the primary lens is required to stabilise drift, but it does double the available flight path over which drift focusing may be achieved.

The ion beam then returns to the deflector 37 and drift focusing lens 41. In regular single pass mode, the deflector 37 will accelerate ions out of the drift region, through the tilt corrector 42 and optional post-accelerator, to the detector 38.

The post-accelerator may be a stack of e.g. 4 apertured electrodes, separated by a resistive divider. The detector 38 may be mounted to the back of this stack at a strong accelerating potential (e.g. approximately −10 KV), to improve secondary electron generation.

In the zoom mode, the voltage of the deflector 37 and the drift focusing lens 41 will have switched to beam reversing and focus sustaining modes, similar to or identical to the potentials of the reversing deflector 40 assembly. The ions then oscillate back and forth in the drift dimension, until released by the deflector 37 switching to its regular injection/extraction potential.

Figure 15:
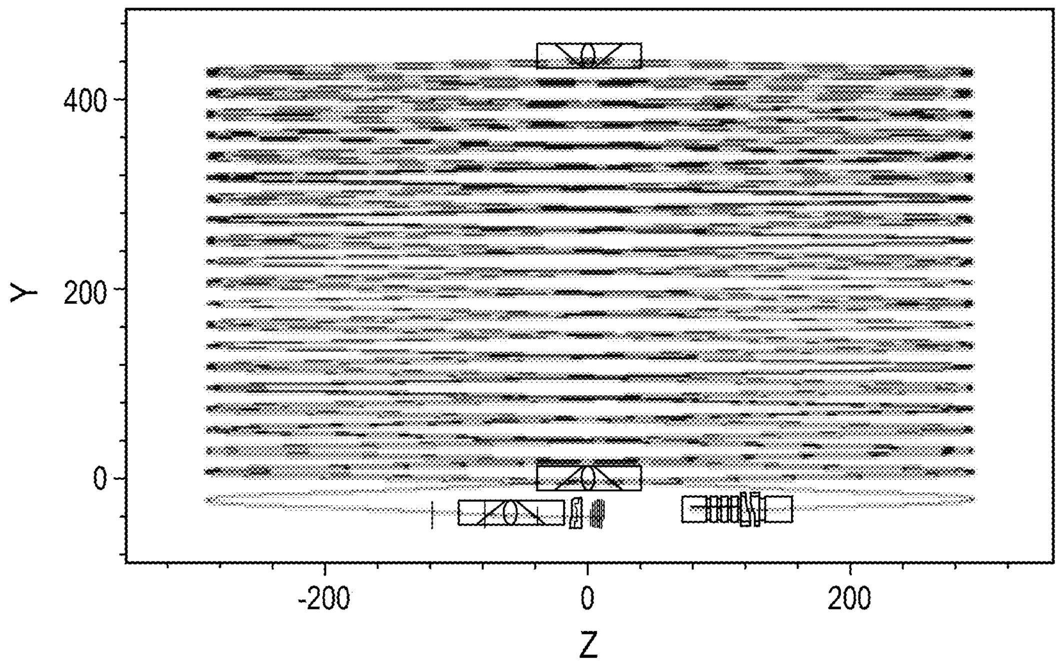
FIG. 15 shows simulated trajectories of ions through a multi-reflection time-of-flight mass analyser being operated in accordance with the method of FIG. 14.

A model of the MR-ToF analyser of FIG. 3 was constructed in MASIM3D, and appropriate m/z 200 ion trajectories were generated and optimised for between one and four drift passes through the instrument. FIG. 15 shows the principal trajectory for four passes. Note that whilst the trajectories for each drift pass roughly overlap, there was some tolerance for error. A 10×1 mm aperture was simulated within the drift dispersion lens 41, to clip excessively divergent ions and to give a loose approximation of transmission losses.

Figure 16:
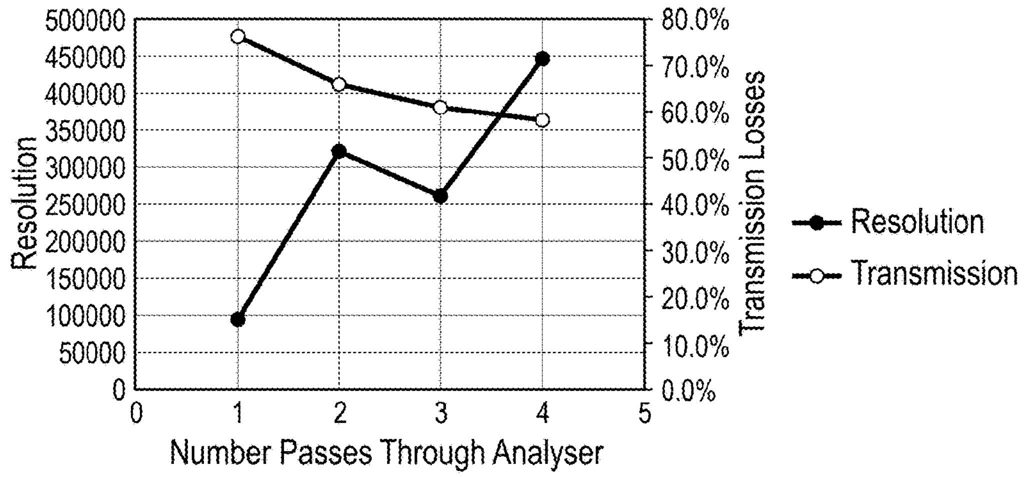
FIG. 16 shows plots of resolution and transmission for a multi-reflection time-of-flight mass analyser being operated in a zoom mode with varying numbers of passes.

Table 2 and FIG. 16 show simulated peak properties at the detector plane, for various numbers of drift passes. The tilt corrector 42 had to be strongly tuned (~2 KV+) for two and three drift passes, but only weakly tuned (<500V) for one and four passes. A single pass with this configuration was able to achieve almost 100K resolution, despite the apparently poorly compensated lens and deflector arrangement, whilst resolution increased disproportionately to >300K for two passes. Evidently there is some self-compensation of aberrations occurring when multiple passes through the lenses are made. Three passes then suffered a large drop in performance, recovered to 450K at four passes. Transmission, measured after first injection through the prism 37, fell with every pass from 76 to 58%, but there were no severe losses.

TABLE 2

| Zoom Level | FWHM/ns | ToF/us | Resolution | Transmission v 1st Lens | Tilt Corrector Potential/V |
|---|---|---|---|---|---|
| 1 | 2.22 | 426.7 | 96104 | 76.1% | −250 |
| 2 | 1.30 | 836.1 | 321577 | 65.8% | 2000 |
| 3 | 2.41 | 1244.8 | 258257 | 61.1% | 2250 |
| 4 | 1.85 | 1653.0 | 446757 | 58.0% | 500 |

Figure 17:
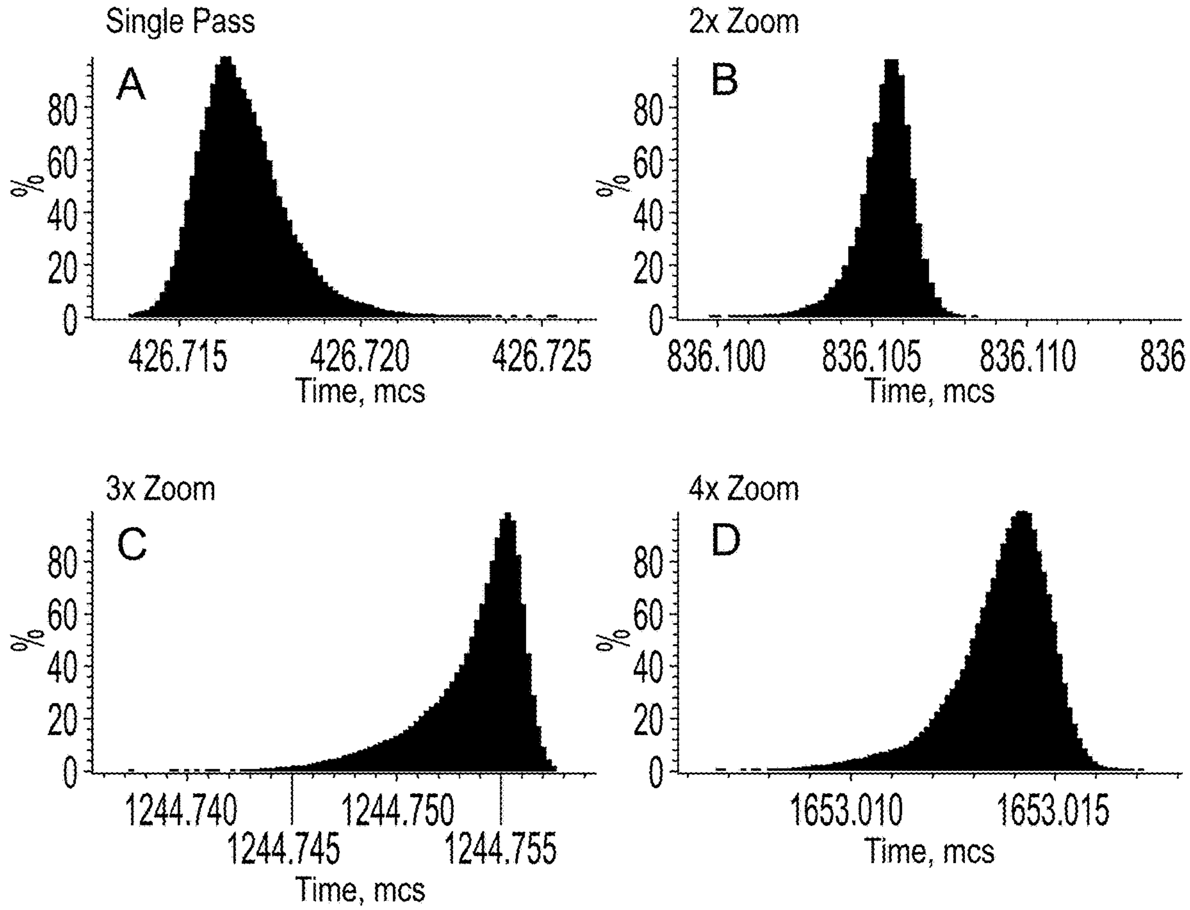
FIG. 17A shows simulated ion peaks determined using a multi-reflection time-of-flight mass analyser being operated in a single pass mode.
FIG. 17B shows simulated ion peaks determined using a multi-reflection time-of-flight mass analyser being operated in a 2× zoom mode.
FIG. 17C shows simulated ion peaks determined using a multi-reflection time-of-flight mass analyser being operated in a 3× zoom mode.
FIG. 17D shows simulated ion peaks determined using a multi-reflection time-of-flight mass analyser being operated in a 4× zoom mode.

FIG. 17 shows the ion arrival time histograms for these results, essentially simulated peak shapes. It was observed that whilst a single pass deviated only slightly from a Gaussian profile, peak fronting increased noticeably at two passes and became intolerable at three, whilst four passes seemed slightly better. It may be that the poor result at three passes is a function of the optimisation, but as it seems to be compensated out at four passes it may be more fundamental.

Figure 18:
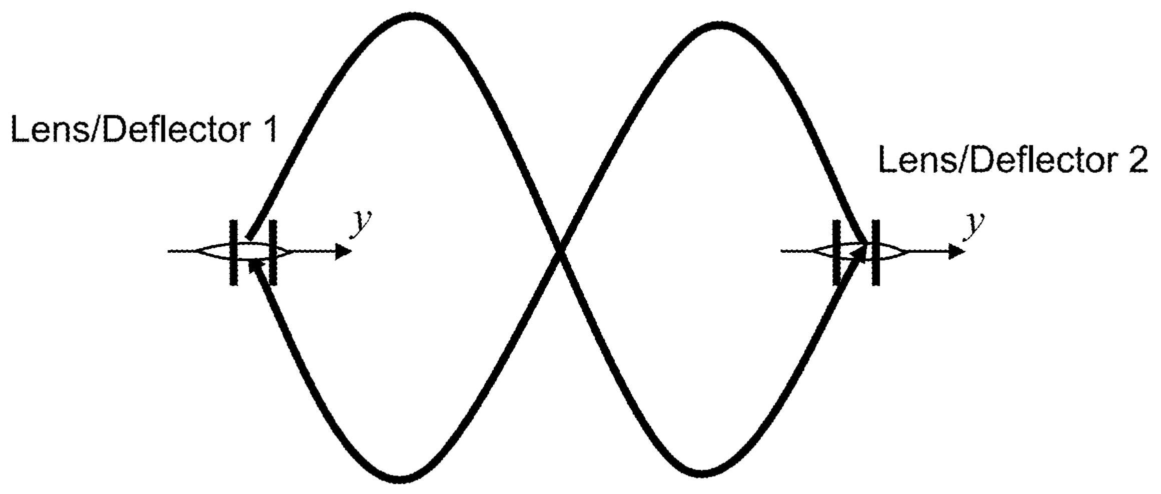
FIG. 18 shows schematically a multi-reflection time-of-flight mass analyser comprising two lens/deflector assemblies.

FIG. 18 shows a simplified schematic illustration of a two-lens drift focusing arrangements in an MR-ToF.

Consider drift matrix $$M_D = \begin{bmatrix} 1 & l \\ 0 & 1 \end{bmatrix},$$

and focusing matrix $$M_F = \begin{bmatrix} 1 & 0 \\ -\frac{1}{f} & 1 \end{bmatrix}$$

acting on the vector $$\begin{pmatrix} y \\ \frac{\dot{y}}{v_0} \pm \theta_0 \end{pmatrix},$$

where l is the effective flight path between lenses and f is the focal distance. The deflection angle is set to $2\theta_0$ for both Lens/Deflector LD1 and LD2.

$$\text{Complete loop } M(l, f) = M_F M_D M_F M_D = \begin{bmatrix} 1 - \frac{l}{f} & 2l - \frac{l^2}{f} \\ \frac{l}{f^2} - \frac{2}{f} & 1 - \frac{3l}{f} + \frac{l^2}{2f^2} \end{bmatrix}$$

$$B = \frac{1}{2} \text{ trace } M = 1 - \frac{2l}{f} + \frac{l^2}{4f^2}$$

The stability condition if |B|<1 and if fulfilled for weak converging lenses:

$$0 < \frac{l}{f} < 2.$$

The eigenvalues of M are $e^{i\beta}$ where $$\beta = \arg\left(B + i\sqrt{1 - B^2}\right) = \text{acos } B = \text{acos}\left(1 - \frac{2l}{f} + \frac{l^2}{4f^2}\right).$$

Note that LD1 and LD2 do not compensate the TOF errors of each other. Nevertheless, it is possible that the aberrations of LD1 are compensated on multiple passes in it, and the same for LD2. If the number of full loops is set to K, the optimal values of the focusing force (optimal ratio l/f) should give β=2l/K.

Figure 19:
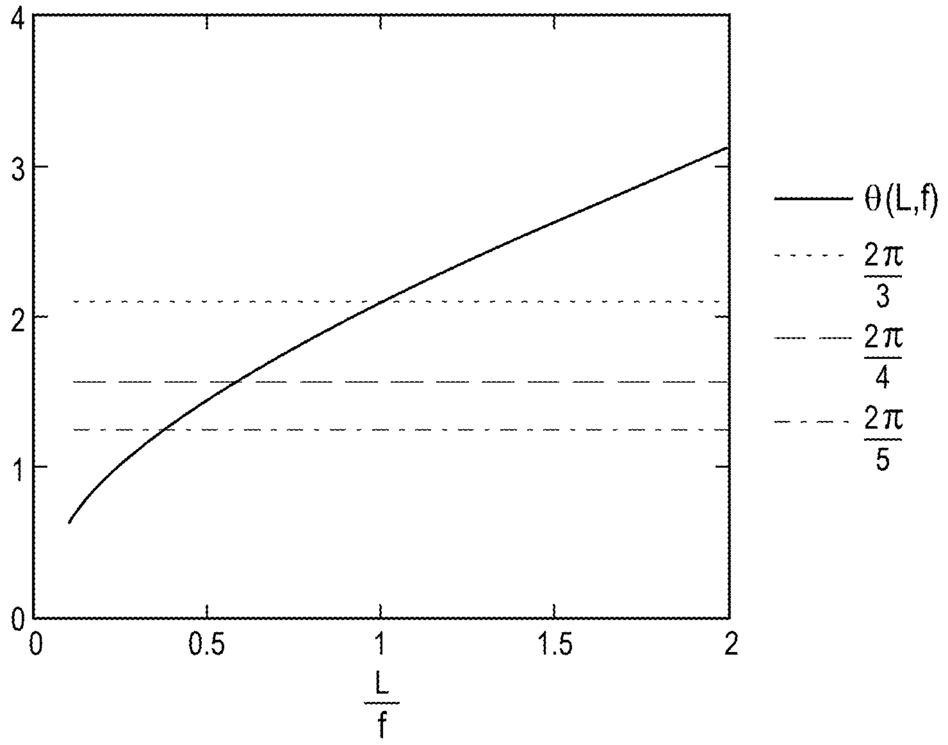
FIG. 19 shows a plot of the ratio of phase space rotation as a function of focal distance for the system of FIG. 18.

FIG. 19 is a plot of the ratio of phase space rotation as a function of focal distance, against flight path L divided by focal length f. Intersections of different numbers of passes (dotted lines 3, 4 and 5) with the line denote compensated points.

It will be appreciated that these embodiments provide a zoom mode, and its resolution multiplying benefits, to the long-focus ToF design of FIG. 3. The long-focus ToF has the advantage of combining a wide enough beam for good space charge performance, with easy electronic compensation of mechanical errors in mirrors.

Embodiments described above show beam reversal in a single pass through the deflector 37. An alternative shown in FIG. 9, sets the deflector 37 to a lower potential required to reduce drift velocity to zero. Ions then make a single oscillation and re-enter the deflector 37, which then completes the drift reversal.

Figure 20:
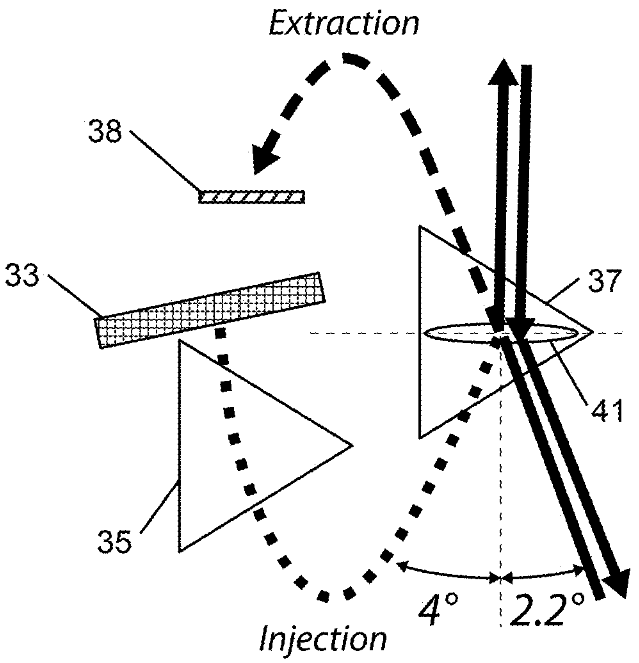
FIG. 20 illustrates schematically a method of operating a multi-reflection time-of-flight mass analyser in accordance with embodiments.

FIG. 20 shows this concept when the dispersion lens 41 is included. In these embodiments, the dispersion lens 41 may also be set to a slightly lower value, e.g. approximately −7.5V, to achieve the same effect in two passes that is normally made with one.

As described above, in some embodiments, this type of drift direction reversal means that ions with an odd number of passes are bounced out of the analyser to the ion trap 33 instead of to the detector 38. However, in this long-focus type analyser, where there are two reversing deflectors 37, 40 at opposite sides of the analyser, if both operate in the mode depicted by FIG. 20, then this problem no longer occurs. As such, the analyser can be operated in zoom mode using any number (odd or even) of passes.

It will be appreciated from the above that embodiments provide an improved multi-reflection time-of-flight mass analyser. The integration of a zoom mode into an analyser (of a type in which the ion beam is allowed to spread out relatively broadly) provides high resolution operation while allowing the analyser to remain drift focused, which means that the analyser can be seamlessly switched between its normal mode of operation and the zoom mode of operation.

Although the present invention has been described with reference to various embodiments, it will be understood that various changes may be made without departing from the scope of the invention as set out in the accompanying claims.

The invention claimed is:

1. A method of operating a multi-reflection time-of-flight mass analyser that comprises:

two ion mirrors spaced apart and opposing each other in a first direction X, each mirror elongated generally along a drift direction Y between a first end and a second end, the drift direction Y being orthogonal to the first direction X;

an ion injector for injecting ions into a space between the ion mirrors, the ion injector located in proximity with the first end of the ion mirrors;

a detector for detecting ions after they have completed a plurality of reflections between the ion mirrors, the detector located in proximity with the first end of the ion mirrors; and a deflector located in proximity with the first end of the ion mirrors;

the method comprising:

(i) injecting ions from the ion injector into the space between the ion mirrors, wherein the ions complete a first cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(ii) using the deflector to reverse the drift direction velocity of the ions such that the ions are caused to complete a further cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(iii) repeating step (ii) one or more times; and then (iv) causing the ions to travel from the deflector to the detector for detection;

wherein the method comprises causing the ions to travel from the deflector to the detector for detection only after the ions have completed in total an odd number of cycles.

2. The method of claim 1, wherein the deflector comprises one or more trapezoid shaped or prism-like electrodes arranged adjacent to the ion beam.

3. The method of claim 1, wherein the method comprises causing the ions to travel from the deflector to the detector for detection only after the drift direction velocity of the ions has been reversed by the deflector in total an even number of times.

4. The method of claim 1, wherein the method comprises preventing ions that have completed in total an even number of cycles from travelling from the deflector to the detector.

5. The method of claim 1, wherein the analyser comprises a drift focusing lens arranged within the deflector, and wherein the method comprises:

applying a first voltage to the drift focusing lens when the ions are injected into the space between the ion mirrors; and applying a second different voltage to the drift focusing lens when the deflector is used to reverse the drift direction velocity of the ions.

6. A method of operating a multi-reflection time-of-flight mass analyser that comprises:

two ion mirrors spaced apart and opposing each other in a first direction X, each mirror elongated generally along a drift direction Y between a first end and a second end, the drift direction Y being orthogonal to the first direction X;

an ion injector for injecting ions into a space between the ion mirrors, the ion injector located in proximity with the first end of the ion mirrors;

a detector for detecting ions after they have completed a plurality of reflections between the ion mirrors, the detector located in proximity with the first end of the ion mirrors;

a deflector located in proximity with the first end of the ion mirrors; and a drift focusing lens arranged within the deflector;

the method comprising:

(i) injecting ions from the ion injector into the space between the ion mirrors, wherein the ions complete a first cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(ii) using the deflector to reverse the drift direction velocity of the ions such that the ions are caused to complete a further cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(iii) causing the ions to travel from the deflector to the detector for detection;

wherein the method further comprises:

applying a first voltage to the drift focusing lens when the ions are injected into the space between the ion mirrors; and applying a second different voltage to the drift focusing lens when the deflector is used to reverse the drift direction velocity of the ions.

7. The method of claim 6, further comprising applying the second voltage or a third different voltage to the drift focusing lens when the ions are caused to travel from the deflector to the detector for detection.

8. The method of claim 1, wherein (ii) using the deflector to reverse the drift direction velocity of the ions comprises applying a voltage to the deflector that causes ions to exit the deflector with a drift direction velocity opposite to the drift direction velocity with which the ions entered the deflector.

9. The method of claim 1, wherein (ii) using the deflector to reverse the drift direction velocity of the ions comprises applying a voltage to the deflector that causes the drift direction velocity of the ions to be reduced to approximately zero, such that ions exit the deflector in the first X direction and are reflected from an ion mirror back into the deflector, whereupon the deflector acts to change the drift direction velocity of the ions from zero to a drift direction velocity opposite to the drift direction velocity with which the ions originally entered the deflector.

10. A method of operating a multi-reflection time-of-flight mass analyser that comprises:

two ion mirrors spaced apart and opposing each other in a first direction X, each mirror elongated generally along a drift direction Y between a first end and a second end, the drift direction Y being orthogonal to the first direction X;

an ion injector for injecting ions into a space between the ion mirrors, the ion injector located in proximity with the first end of the ion mirrors;

a detector for detecting ions after they have completed a plurality of reflections between the ion mirrors, the detector located in proximity with the first end of the ion mirrors; and a deflector located in proximity with the first end of the ion mirrors;

the method comprising:

(i) injecting ions from the ion injector into the space between the ion mirrors, wherein the ions complete a first cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector;

(ii) using the deflector to reverse the drift direction velocity of the ions such that the ions are caused to complete a further cycle in which the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector; and (iii) causing the ions to travel from the deflector to the detector for detection;

wherein (ii) using the deflector to reverse the drift direction velocity of the ions comprises applying a voltage to the deflector that causes the drift direction velocity of the ions to be reduced to approximately zero, such that ions exit the deflector in the first X direction and are reflected from an ion mirror back into the deflector, whereupon the deflector acts to change the drift direction velocity of the ions from zero to a drift direction velocity opposite to the drift direction velocity with which the ions originally entered the deflector.

11. The method of claim 10, wherein the ion mirrors are a non-constant distance from each other in the X direction along at least a portion of their lengths in the drift direction Y, wherein the drift direction velocity of ions towards the second end of the ion mirrors is opposed by an electric field resulting from the non-constant distance of the two mirrors from each other, and wherein the electric field causes the ions to reverse their drift direction velocity in proximity with the second end of the ion mirrors and drift back along the drift direction towards the deflector.

12. The method of claim 10, wherein the deflector is a first deflector, and the analyser comprises a second deflector located in proximity with the second end of the ion mirrors, wherein the second deflector is configured to cause the ions to reverse their drift direction velocity in proximity with the second end of the ion mirrors and drift back along the drift direction towards the first deflector.

13. The method of claim 12, wherein the method comprises:

using the second deflector to reverse the drift direction velocity of the ions by applying a voltage to the second deflector that causes the drift direction velocity of the ions to be reduced to approximately zero, such that ions exit the second deflector in the first X direction and are reflected from an ion mirror back into the second deflector, whereupon the second deflector acts to change the drift direction velocity of the ions from zero to a drift direction velocity opposite to the drift direction velocity with which the ions originally entered the second deflector.

14. The method of claim 1, wherein (iv) causing the ions to travel from the deflector to the detector comprises applying a voltage to the deflector that causes the ions to exit the deflector in a direction towards the detector.

15. The method of claim 1, further comprising:

selecting or filtering ions upstream of the analyser, such that the ions received by the injector and injected into the analyser are within a selected mass to charge ratio (m/z) range.

16. The method of claim 1, further comprising operating the analyser in another mode of operation that comprises:

injecting ions from the ion injector into the space between the ion mirrors, wherein the ions follow a zigzag ion path having plural reflections between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector; and then causing the ions to travel from the deflector to the detector for detection.

17. The method of claim 16, further comprising switching operation of the analyser between the zoom mode of operation and the other mode of operation by controlling the voltage applied to the deflector.

18. A non-transitory computer readable storage medium storing computer software code which when executed on a processor performs the method of claim 1.

19. A control system for a mass spectrometer, the control system configured to cause the mass spectrometer to perform the method of claim 1.

20. A mass spectrometer comprising:

an ion source; and the control system of claim 19.

21. The method of claim 6, further comprising repeating step (ii) one or more times prior to performing step (iii).

22. The method of claim 10, further comprising repeating step (ii) one or more times prior to performing step (iii).

* * * * *